(12) United States Patent
Ellis

(10) Patent No.: US 6,877,460 B1
(45) Date of Patent: Apr. 12, 2005

(54) ANIMAL SORTING AND GRADING SYSTEM USING MRI TO PREDICT MAXIMUM VALUE

(75) Inventor: James S. Ellis, Broomfield, CO (US)

(73) Assignee: Pheno Imaging, Inc., Broomfield, CO (US)

( * ) Notice: Subject to any disclaimer, the term of this patent is extended or adjusted under 35 U.S.C. 154(b) by 0 days.

(21) Appl. No.: 10/713,629

(22) Filed: Nov. 14, 2003

(51) Int. Cl.$^7$ ............................................ A01K 29/00
(52) U.S. Cl. ..................................... 119/842; 119/840
(58) Field of Search ................................ 119/840, 841, 119/842, 14.08, 14.18

(56) References Cited

U.S. PATENT DOCUMENTS 5,673,647 A * 10/1997 Pratt ........................ 119/51.02

OTHER PUBLICATIONS

Teira, Gustavo Adolfo, Tinois, Eduardo, Lotufo, Roberto de Alencar et al. Digital–image analysis to predict weight and yields of boneless subprimal beef cuts. Sci. agric. (Piracicaba, Braz.), Abr./Jun. 2003, vol. 60, No. 2, p. 403–408. ISSN 0103–9016.□□.*
http://www.rttc.colostate.edu/pdf/belk.pdf; "Video Imaging Bringing More Flavor to the Table", Oct. 2003.*

"Video Image Analysis to Impact Profit", Bottom Line, Mar. 2003, pp. 1–8.*
Schroeder, et al., Fed–Cattle Grid–Pricing Valuation: Recommendations for Improvement, Dec. 2003, Publisher: Kansas State University.
National Cattlemen Management System at Lane County Feeders, Aug., 1999, Publisher: National Cattlemen, Published in: Dighton, KS.
Kate Murphy, Get Along Little Dogie #384–591E, Jul. 21, 1997, Publisher: New York Times, Published in: New York, NY.

* cited by examiner

Primary Examiner—Yvonne R. Abbott
(74) Attorney, Agent, or Firm—James R. Young

(57) ABSTRACT

A system that compares, ranks, sorts and grades animals or carcasses into groups of like kinds according to previously determined predicted maximum values. For live animals, the system uses magnetic resonance imaging (MRI) on a single occasion to evaluate the animal and determine a number of days the animal must be fed to reach a maximum value. For carcasses, the system evaluates the carcass to grade the quality and quantity of meat the carcass will provide. The system also combines MRI imaging with a three-dimensional system to refine the number of days remaining for the animal to reach a maximum value, and the system, when used in a feedlot, will direct the animal to a feed pen based on the number of days remaining for the animal to reach maximum value.

29 Claims, 14 Drawing Sheets

ANIMAL SORTING AND GRADING SYSTEM USING MRI TO PREDICT MAXIMUM VALUE

FIELD OF THE INVENTION

This invention relates to a process for comparing, ranking, grading and sorting animals or carcasses into groups of like kinds by using internal evaluations on a single occasion and predicting a timeframe in which an animal or carcass reaches a predetermined maximum value. More particularly, the invention uses magnetic resonance imaging (MRI) for those evaluations that result in predicting the time frame for the desired maximum value. Even more particularly, this invention relates to the use of MRI on a single occasion, preferably in concert with structured light, light pattern triangulation and/or laser light three-dimensional animal surface modeling systems, 3-D systems (3DS), to evaluate an animal or carcass to predict the timeframe to achieve a desired predetermined maximum value and compare, rank, grade or sort them accordingly.

BACKGROUND OF THE INVENTION

One of the greatest challenges facing the meat producing industry today is to provide consistent uniform quality and conformity for their end products. In beef cattle feeding the inconsistencies are the number of days an animal is fed (days on feed) to reach its maximum potential carcass value at which time the animal is referred to as finished. During the cattle feeding period the average number of days on feed for an entire pen of 300 animals is approximately 120 days. The entire pen is then marketed to a beef processor.

The inconsistencies arise because a few animals are finished after being fed only 85 days, others 95 days and still others 105 days. Larger portions of the animals are finished between 105 days and the 120- day average. These animals are over-fed and continue to gain additional unwanted body fat until the entire pen of cattle is marketed on the $120^{th}$ day. Within a pen of animals, an average of 5% or 15 head are over-fed resulting in being too fat. The results are reduced prices called yield grade discounts or "Heavy" for the carcasses at the processing plant. The yield grade discount average can reduce the value of the carcass by 15–20%. An additional 10% or 30 head can be over-fed resulting in reduced carcass prices in the range of 3–5% per animal.

It might seem that a logical approach to reduce yield grade discounts would be to sort out the 30 animals on day 110 for example and deliver them to market. This solution creates two additional problems. First of all, a human visual sorting will only be partially accurate when compared to the results at the processing plant, therefore, one may not find the correct 30 animals. Secondly, the disturbance of sorting 30 animals out of the pen and the disturbance as the remaining animals re-align the pecking order within the pen can cause several days of no weight gain for the remaining 270 animals. This likely will cost the cattle feeder more than the yield grade discounts.

Another inconsistency is the portion of animals within the pen that need more than 120 days on feed to reach their maximum potential carcass value. There are an average of 115 underfed animals that are marketed with the entire pen. At the processing plant their carcasses are lighter in weight, not finished and they receive carcass discounts when they are designated by the plants as "lites". An average of 2% or 6 animals within the entire pen of 300 animals are lites and receive carcass discounts that reduce the value of each carcass as much as 15–20% per animal.

There is also a hidden added value within this group of 115 under-fed animals. An average of 70% or 80 animals of the 115 under-fed group could be fed an additional 5–20 days allowing them to reach their maximum potential carcass value. Instead of receiving a reduced carcass value, these animals would actually receive an additional increase in carcass value of 5–10% per head as they reach their maximum carcass value.

A final inconsistency is caused by a lack of genetics that prevent a portion of the animals from reaching even the minimum carcass values. An average of 12% or 36 animals within the entire pen of 300 animals are genetically unable to attain carcass values that would provide a profit for cattle feeders. Additional days on feed will only result in additional unwanted backfat. This would not improve the quality of the meat within the carcass nor the potential carcass value. These genetic related carcass losses can range from 5% to nearly 30% per animal.

The over-fed yield grade discount losses plus the under-fed carcass discount losses plus the hidden added value plus the genetic losses combine for a total uncaptured added value potential of over 4–5% for the entire pen of 300 head of cattle. With over 25 million beef cattle fed annually, these uncaptured values are costing the industry well over $1 billion.

Historically, in that last half century, the use of individual animal identification combined with the animal's weight on the day they entered the feedlot was one of the factors used to sort the cattle into pens. As feedlots grew larger the cattle feeders soon found that an added step of having a visual human appraisal (the keen eye of a good "cattle feeder") was helpful in sorting the cattle by size; tall and long, middle sized, or short and compact. Not unlike grouping the $1^{st}$ graders, $2^{nd}$ graders and $3^{rd}$ graders, this procedure allowed similar sized animals to increase their daily rate of gain adding value to the bottom line.

There is another segment of the beef industry called the cow-calf operations. These operations with beef cow herds annually produce a crop of calves. The female calves are usually retained for herd replacements, however, some can go on to the feedlots and eventually to the processing plants. The majority of the male calves are raised and sold to feedlots to be fattened and then on to the processing plants. Cow-calf operators also face the challenge to provide consistent uniform quality and conformity for their calf crops that eventually become the selected meat cuts on the store shelf.

Annually, cow-calf operators struggle with critical decisions that directly effect their profits at the point of sale of their male calf crop. Other decisions effect their future herd profits when selecting female herd replacement from their female calf crop. Perhaps one of the most critical decisions that cow-calf operations make is that of bull selections. The bull selection decisions will have the greatest single impact on the future production of their cow-calf herd by introducing improved genetics into their herd. Historically, several factors have been used to make these decisions, including the keen eye of a good "cow-calf operator", the individual identification of the bulls, cows and calves combined with live weight measurements.

Finally, the need continues within the processing (packing) plants to improve the uniform quality and conformity for the end meat products. Meat orders often consist of sorting carcasses or carcass segments that are within a certain size, weight range and quality of meat. The quality of the meat is determined by the USDA (U.S. Dept. of Agriculture) meat inspectors (graders). The carcass is severed between the $12^{th}$ and $13^{th}$ rib allowing the USDA grader to view a cross-sectional area of the internal longissimus dorsi muscle that is commonly referred to as the ribeye because it eventually becomes a cut known as the ribeye steak.

By using a template device and subjective visual appraisal, the USDA grader evaluates both the surface area of the ribeye and the flecks of intramuscular fat (I. Fat) within the ribeye. Flecks of I. Fat (a.k.a. marbling) or the percentage of I. Fat that is found in the ribeye area is used to grade the entire carcass. The percentage of I. Fat can vary dramatically from one carcass to another. The range of I. Fat can be as low as 1% in one carcass and as high as 12% in another carcass that would receive the highest grading as USDA Prime. More marbling within the muscle has a very positive correlation to the tenderness, juiciness, palatability and cooked flavor of the meat. The USDA grader rates each carcass as USDA Prime, USDA Choice, USDA Select, etc. With a very few exceptions, feedlot operators receive the highest price for USDA Prime carcasses and receive a lesser price with each respective grading. In turn, processing plants with very few exceptions, receive the highest price in the retail market for USDA Prime meat cuts with each respective grading a lesser price.

Historically, the USDA grader is on for one hour grading an average of 400 carcasses and then off for one hour. The question is, how exacting is the grading when comparing the beginning of the hour with the end of the hour or does the grader's accuracy in the first hour in the morning hold true after making 1600 grading decisions by the end of the day?

Similar inconsistencies can be found within segments of the swine and poultry industries. Although the variance in the degrees of inconsistency and the value placed thereon may vary, the need for consistent uniform quality and conformity remains.

The dairy cattle industry (milking cows) continually searches for means to increase milk production as well as improve correct functional conformations so that the milking females can have more productive years within the milking herd. The need to improve predicted future milk production potential in younger heifers is at the top of the priority list. Historically, there have been numerous means for predicting milk production using genetic breed improvement formulas for a small portion of the dairy cattle population. In this small portion of the population the producers maintain rigorous identification records that allow them to calculate predicted future milk production formulas from ancestor's pedigree performances. However, there are 2.4 million bred heifers sold annually into dairy herds that have no history of ancestor performance and very little or no identification.

The developing mammary system of dairy heifers (a.k.a. bred heifers) that are 30 to 60 days away from their first calving can be used to predict future milk production for that large group of bred heifers lacking identified ancestor performance. It is well known that the milk secretion cell count continually increases within the mammary system as the heifer approaches calving. It is also known that there is a positive correlation between the number of milk secretion cells in a bred heifer and her potential for future milk production. By accurately evaluating the number of milk secretion cells and providing stage of pregnancy adjustments, it is then possible to formulate predicted future milk production.

More recently, systems have evolved using two-dimensional video techniques in an attempt to measure external animal conformation, however, these systems have been very limited in that they are only able to measure a few linear conformation traits. Other systems have evolved using ultrasound technologies in an attempt to measure internal traits of an animal or carcass such as the size of a ribeye muscle, the percentage of I. Fat and the thickness of the backfat on an animal. However, ultrasound has a very low accuracy for determining the percent intramuscular fat within the animal/carcass because of an unsolvable problem referred to as "speckle", wherein the sound waves splash in all directions when encountering a fat cell. An ultrasound system also relies heavily on a highly skilled technician to interpret the images.

Additionally, other systems combine several of the above systems for beef animals during a feedlot period using feedlot entry day images and subsequent images in combination with several age-old measuring techniques such as animal weight to calculate an optimum slaughter date and thereafter sort the animals into groups with similar slaughter dates. However, it is possible, that when several systems with limited accuracies are combined it produces a multiplying effect on the inaccuracies of the entire system.

Still other systems explain the use of a high-resolution color video camera viewing (in two-dimensional) a sliced cross-section of a carcass ribeye muscle. Using video color readings and 2-D pictorial digitized surface images, the system attempts to determine the percentage of intramuscular fat for USDA grading which is then translated in nomenclature to palatability, tenderness and yield. In addition to the low accuracy with 2-D measuring, the muscle must be severed to acquire the video images.

Thus, there is a tremendous need within the feedlot segment of the livestock industry to use the most accurate internal and external evaluations to predict a timeframe in which the animal reaches a predetermined maximum value and to sort those animals into groups of like kinds. There is also a tremendous need within the production segment (i.e. cow-calf) of the livestock industry to use the most accurate internal and external evaluations to compare offspring to parentage for genetic improvement evaluations, to compare and sort offspring with like kinds for market and future sales, to compare female offspring with like kinds to sort and determine herd replacements, and to compare potential sires with like kinds for future use in the herd with all of the above evaluations designed to achieve a predetermined maximum value. There is an additional need to use the most accurate internal and external evaluations within the processing plants to evaluate and compare carcasses to like kinds, provide grading/grading assistance and sort them for predetermined maximum value for future sales. There is still a further need within the dairy cattle industry to use the most accurate internal and external evaluations to determine the number of milk secretion cells in the developing mammary system of a bred heifer along with the over-all body conformation to predict future milk production and longevity within the milking herd.

One method for combining individual animal identification and sorting cattle is described in U.S. Pat. No. 4,617,876 issued Oct. 21, 1986 to Hayes, entitled, "Animal Identification and Control System". This method describes identifying cattle (previously given identification or I.D.) at a water source and sorting cattle for various reasons into an "exit way pen" or an "exit way path" and then sorting them further into "holding pens". The exit way pen or exit way path may be an unnecessary step in the sorting process. Additionally, the exit way pen, the exit way path or the holding pens provide no feed, no water and added stress for the sorted animal.

Other methods for evaluating animals is shown in U.S. Pat. No. 4,745,472 issued May 17, 1988 to Hayes, entitled, "Animal Measuring System". This method uses a video camera to take a picture of the animal with plastic patches placed on several points of the animal. The pictured is processed by a computer system to determine a few linear measurements between these points. Another method of evaluating an animal is shown in U.S. Pat. No. 5,483,441 issued Jan. 9, 1996 to Scofield, and U.S. Pat. No. 5,576,949 issued Nov. 19, 1996 to Scofield and Engelstad, with both Patents entitled, "System for Evaluation Through Image Acquisition" along with U.S. Pat. No. 5,644,643 issued Jul. 1, 1997 to Scofield and Engelstad, entitled, "Chute For Use With An Animal Evaluation System". The above systems use a video camera for an external evaluation, so they can only measure in two-dimensions and make no reference to three-dimensional measuring. None of the above systems include any reference for internal evaluations of an animal.

An additional method for compiling animal conformation and sorting cattle into groups of like kinds by calculated slaughter dates is shown in the following U.S. Pat. No. 5,673,647 issued Oct. 7, 1997, U.S. Pat. No. 6,000,361 issued Dec. 14, 1999, U.S. Pat. No. 6,135,055 issued in Oct. 24, 2000, U.S. Pat. No. 6,318,289 issued Nov. 20, 2001 and U.S. Pat. No. 6,516,746 issued Feb. 11, 2003 all issued to Pratt and all entitled, "Cattle Management Method and System". The methods described in all of these patents use an initial external measuring and an internal measuring of the animals as they enter the feedlot and then a remeasuring or subsequent external and internal measuring of the animals at a later point in time in the feedlot. The change from the initial measurements to the subsequent measurements are used to determine the slaughter date for the animal and then the animals are again sorted into groups of like kinds. Again, the above methods and systems rely on two-dimensional external measuring and make no reference to three-dimensional external measuring of an animal. These methods also describe the use of ultrasound for the internal measuring of animals and make neither reference to, nor provide any description of, magnetic resonance imaging (MRI) as a means for internal measuring of animals.

Still other methods using ultrasound for internal measuring of animals and carcasses are described in the following U.S. Pat. No. 5,573,002 issued Nov. 12, 1996 entitled, "Method and Apparatus for Measuring Internal Tissue Characteristics in Feed Animals", and No. 5,836,880 issued Nov. 17, 1998 entitled, "Automated System for Measuring Internal Tissue Characteristics in Feed Animals", and No. 6,200,210 issued Mar. 13, 2001 entitled, "Ruminant Tissue Analysis at Packing Plants for Electronic Cattle Management and Grading Meat" with all issued to Pratt. Again, these methods also describe the use of ultrasound for the internal measuring of animals/carcasses and make neither reference to nor provide any description of any means of using MRI for internal measuring of animals/carcasses.

Another method using a high-resolution color video camera to record various colors of a severed surface cross-section of the ribeye area in a carcass to determine palatability and yield is described in U.S. Pat. No. 6,198,834 issued Mar. 6, 2001 to Belk entitled, "Meat Imaging System for Palatability Yield Predictions". Belk's system describes many of the same techniques as used visually by USDA graders, including the measuring of intramuscular fat within the ribeye area as the foundation for grading carcasses and then with nomenclature translations derives palatability and yield. Belk did not describe or suggest the use of ultrasound or MRI as a means to determine palatability and yield in his original application which was filed Feb. 20, 1998. However, in his continuation-in-part application filed Aug. 19, 1999, Belk includes both ultrasound and MRI along with several other imaging means as possible systems for his image analysis (IA) system. In his Description of Illustrative Embodiment, Belk thoroughly explains the use of a color video IA system to determine palatability and yield. He also provides a very limited and very brief explanation of the use of tomographics (CAT or PET) and ultrasound for his (IA) system to secure the palatability and yield results. Belk fails to describe in any manner the means by which the MRI would be used in his image analysis (IA) system and makes no attempt to explain the method or means in which MRI could determine or provide palatability and yield predictions of meat. Additionally, Belk fails to explain that one advantage of MRI technology is the fact that the carcass does not need to be severed to attain intramuscular fat distribution, I. Fat percentages and ribeye surface area measurements that are used in part to determine palatability and yield.

It is thus apparent that there is a need in the art for an improved process for comparing, sorting and grading animals in to groups of like kinds by evaluating and predicting a timeframe in which an animal or carcass reaches a predetermined maximum value. There is a further need in the art for such a process to secure internal evaluations of animals or carcasses with improved accuracy. Another need in the art is to secure internal evaluations without severing a carcass. And still a further need in the art is for such a process to secure external measurements of an animal or carcass in three-dimensions. A further need is for such a process that does not require that patches be affixed to the animal before measuring. A still further need is for such a process that can measure with improved accuracy in three-dimensional means to provide linear, volume and angular measurements. An additional need in the art is for such a process that can sort animals without unnecessary exit way pens, exit way paths or holding pens all of which may not provide feed and water for the animals. There is a further need in the art for such a process with an internal evaluation that may preferably be combined with an external evaluation conducted on a single occasion that could predict a timeframe for the animal to reach a predetermined maximum value and compare or sort that animal into groups of like kinds without remeasuring or subsequent imaging the animal at a later time in the feedlot. Another need in the art for a process that can evaluate milk secretion cells within the developing mammary of a female, predict future milk production and compare and sort that animal into groups of like kinds. The present invention meets these and other needs in the art.

SUMMARY OF THE INVENTION

It is an aspect of the present invention to compare, rank, sort and grade animals or carcasses with a computer system into groups of like kinds according to previously determined predicted maximum values.

Another aspect of this invention is to provide an internal evaluation of the animal or carcass with magnetic resonance imaging (MRI) on a single occasion.

Still another aspect is to predict a timeframe with a computer system in which an animal or carcass can reach a predetermined maximum value.

Yet another aspect is to provide an external evaluation when applicable of the animal or carcass with a three-dimensional system (3DS) on a single occasion in concert with the MRI.

And still another aspect is to use the MRI/3DS evaluations and a computer system that will compare the animal or carcass to groups of like kind and thereby predict a timeframe in which an animal or carcass will reach a predetermined maximum value and the computer systems will sort and direct the animal or carcass into groups of like kind.

Within the feedlot segment of the beef industry, cattle are compared, ranked, and sorted using MRI/3DS evaluations on a single occasion. The MRI evaluations include a very accurate internal measuring of the longissimus dorsi muscle, referred to as the ribeye, between the $12^{th}$ and $13^{th}$ rib area of an animal. The evaluation using MRI measures the size of the ribeye, percent of intramuscular fat (I. Fat) and the I. Fat distribution within the ribeye muscle. MRI evaluations account for nearly every single I. Fat cell within the image area. Even microscopic I. Fat cells (a.k.a. marbling flecks) that can not be seen with the human eye, would not show on an ultrasound image and would probably be missed by a high resolution 2-D cameras are accounted for in the percent of intramuscular fat data in the MRI evaluations. The 3DS evaluation includes the use of a three-dimensional animal measuring system to measure linear, volumetric and angular conformation traits of an animal. A computer system used for the MRI/3DS evaluations can be unique to the MRI/3DS evaluations or can be combined with most computer systems within the industry.

The MRI portion of the MRI/3DS evaluation is used to accurately determine the percent I. Fat of an animal which in turn is in used to provide the basic timeframe (number of days) needed to reached maximum carcass value. Numerous other factors add to or subtract from the number of days that the animal needs to remain on full feed in the feedlot to reach maximum carcass value. These factors with numerous variations include but are not limited to the external 3DS evaluation of the animal's conformation, sex, feedlot entry weight, ration, regional climate and, if known, the breed type and age. Beginning with the feedlot entry date, the timeframe or number of days on feed is adjusted for the various factors and a predicted days to maximum value (PDMV) is calculated for the animal.

As animals enter the feedlot they are evaluated with the MRI/3DS and given a PDVM. The PDMV is then recorded by a unique tag for the animal or with the animal's feedlot identification means used throughout the feedlot computer system. The computer system then sorts the animal by PDMV and directs the animal to a pen with animals that have identical PDMVs or similar PDMV ranges. The result is that all of the animals in a particular feedlot feeding pen go to market on or about the same PDMV day which dramatically reduces, if not eliminates, the dollars lost with the over-fed/under-fed dilemma.

The present invention also has advantages in the cow-calf segment and the carcass segment of the beef industry. Using similar techniques the cow-calf operators can evaluate their calf crop using MRI/3DS along with computer means to rank, compare and sort the offspring for future sales, herd replacement and herd sire selection. Carcasses can be accurately measured using the MRI/3DS evaluations along with computer systems to rank, compare and sort carcasses in a grading system that is like or similar to the current USDA grading system.

There are additional advantages of the present invention in the dairy cattle industry. Using a MRI evaluation of the developing mammary of a bred heifer, the milk secretion cell count can be determined with the same accuracy as found when evaluating the beef ribeye. The cell count with adjustments for stage of pregnancy determines predicted future annual milk yield. Thereafter, along with a computer system, the milk yeild predictions are used to compare, rank and sort heifers into groups of like kinds. The 3DS external evaluations can also be merged with the MRI evaluations to allow the computer sorting system to evaluate and sort individual bred heifers by conformation traits relating to herd life longevity.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
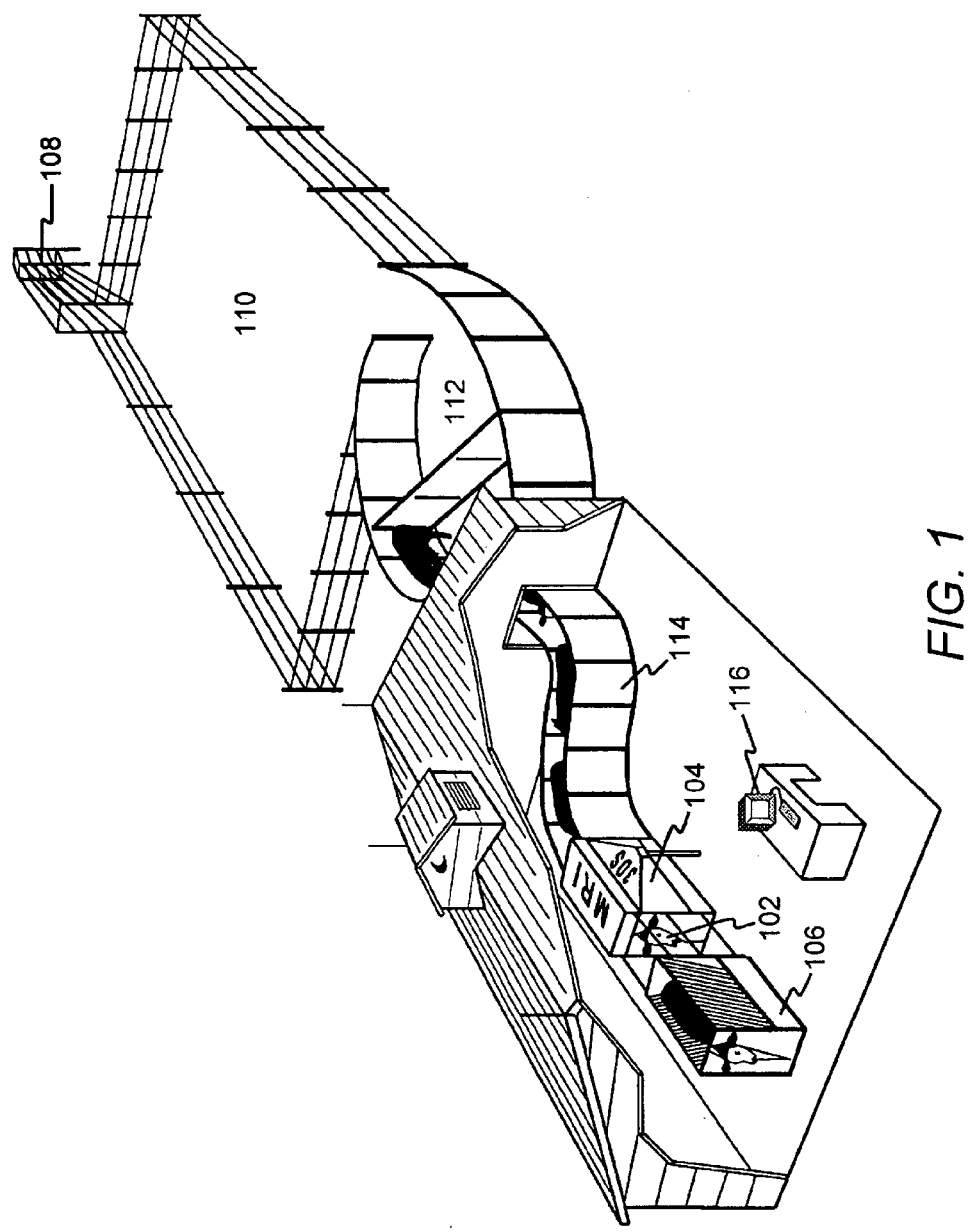
FIG. 1 shows a view of the present invention where the MRI/3DS chute apparatus is placed within the area that is used to process the cattle when entering the feedlot.

The following description is of the best presently contemplated mode of carrying out the present invention. This description is not to be taken in a limiting sense but is made merely to describe the general principles of the invention. The scope of the invention should be determined by referencing the appended claims.

Cattle are sorted into groups in the feedlot segment of the beef industry with a computer system by predicting a timeframe in which each animal will reach a predetermined maximum value. The timeframe, commonly called "days on feed", is the number of days from the date that the animal enters the feedlot until the date that animal reaches a predetermined maximum value. The predetermined maximum value or Predicted Days to Maximum Value (PDMV) in the feedlot segment is when that animal is referred to as "finished". Finished is a term used that indicates that the animal has reached full potential carcass value. This means the animal has been feed the optimum number of days to maximize growth resulting in the maximum quantity of muscle (meat) and the maximum quality of the meat that can be measured by percent intramuscular fat (I. Fat%). If fed beyond the finished date, the result is that the animal gains unwanted fat surrounding the internal organs and unwanted subcutaneous fat, commonly referred to as backfat and may receive carcass discounts in addition to feed cost losses.

As part of the sorting process, each animal is evaluated using Magnetic Resonance Imaging (MRI) or C.A.T scan or P.E.T. scan to examine the animal internally. The MRI internal evaluation is usually taken but not limited to the area between the $12^{th}$ and $13^{th}$ rib of the animal. The evaluation usually includes but is not limited to, measuring the surface area of a cross-section of thin voxels of the ribeye muscle, percent of I. Fat within each thin voxel of the ribeye cross-section, distribution of I. Fat within the ribeye cross-section and the thickness of the backfat along with, if necessary, the thickness of hide in that area. See, for example, U.S. Pat. No. 6,084,407 issued Jul. 4, 2000 to Ellis, entitled, "System for Measuring Tissue Size and Marbling in an Animal", and U.S. Pat. No. 6,288,539 issued Sep. 11, 2001 to Ellis, entitled, "System for Measuring an Embryo, Reproductive Organs, and Tissue in an Animal", incorporated herein by reference for all that is disclosed and taught therein.

The 3DS external evaluation of the animal is completed using any three-dimensional system designed for measuring animals such as laser technology, structured light technology or light pattern triangulation. With a 3DS evaluation, the computer system creates a three-dimensional surface modeling of an animal that can thereafter measure a single linear conformation trait such as stature at the hip. The 3DS evaluation can also include but is not limited to numerous other linear, volumetric, and angular conformation trait measurements such as the volume of the round (rump muscle), volume of the belly, angle of the hip, width of hip, width of shoulder, length of barrel, etc. See, for example, U.S. Pat. No. 5,412,420 issued to Ellis, May 2, 1995 entitled, "Three-Dimensional Phenotypic Measuring System for Animal", and U.S. Pat. No. 6,377,353 issued to Ellis, Apr. 23, 2002 entitled, "Three-Dimensional Measuring System for Animal Using Structured Light", and U.S. Pat. No. 6,549,289 issued to Ellis, Apr. 15, 2003 entitled, "Three-Dimensional Measuring System for Animal Using Light Pattern Triangulation", incorporated herein by reference for all that is disclosed and taught therein.

Cattle arrive at the feedlot from various locations in various numbers with the groups usually averaging 700 pounds per animal. Feedlots can receive a few hundred head per week or up to thousand per day that eventually are sorted into feeding pens holding 200 to 400 head per pen. Normally, the first procedure at the feedlot is to individually process each animal in a traditional chute apparatus. This processing can vary but usually includes inserting or attaching various means of individualized identification (I.ID) which could be various forms of ear tags, electronic identification (EID) tags, implanted electronic systems, internally injected electronic systems or any others means of identification. It is also possible to use the individual animal's MRI image, which is unique to each animal, for I.ID purposes. The entire MRI image or any portion of the referenced pixels or voxels can be solely used for I.ID as well as cross-referenced with any of the above I.ID means. The I.ID is then recorded in many cases, by input to a feedlot computer system, along with various information, facts and data collected for each animal on the entry day process. The information recorded on each individual animal may include but is not limited to the animal's weight, health status, vaccinations, animal health products if administered, health records, inserted implants, etc. all of which is usually recorded by animal I.ID in a feedlot computer data base. This information data for the I.ID animal can be maintained in a history file and additional informational data may be include as the animal progresses through the feeding process and into the processing plant. During this initial process, in the traditional chute apparatus or preferably in an additional chute apparatus placed prior to and in-line with the existing traditional chute, the MRI internal evaluation can be completed on a single occasion. Preferably, but not absolutely necessary, the 3DS external evaluation can be completed in concert with the MRI evaluation.

During this feedlot entry day processing, the MRI portion of the MRI/3DS evaluation which includes but is not limited to ribeye surface area, I. Fat percentage, I. Fat distribution and backfat thickness are used to determine the average days on feed needed for the animal to reach maximum carcass value. For example, previously compiled data would indicate that an animal with 8.2% I. Fat (potential USDA Choice) would commonly require an average of 123 days on feed to reach maximum carcass value. Another animal with 3.5% I. Fat (potential USDA Select) would require an average of 131 days on feed to reach maximum carcass value. The MRI evaluation is used to determine the I. Fat% of each animal and the average number of days on feed (MRI I. Fat% Days) needed to reach their maximum carcass value.

Other factors with numerous variations can add to or subtract from these average days on feed. These factors included but are not limited to the 3DS external evaluation of 3-D surface modeling for animal conformation, sex, feedlot entry day weight, breed type, and age. For example, taller animals need 4 to 8 additional days to reach maximum carcass value when compared to an average sized animal. Shorter more compact animals require 4 to 8 less days to reach maximum carcass value when compared to an average animal. Females require an average of 15 fewer days on feed compared to males (steers). Animals that weigh more than the average 700 pounds when they enter the feedlot will need less days on feed (averaging one less day for each three pounds) while the animals weighing less on entry day will need additional days on feed to reach maximum carcass value. Various breed types such as Semintal, Charlois, Gelbveigh and Limousin, commonly referred to as Continental Breeds (referring to the European Continent), will need 8 to 12 additional days on feed when compared to the traditional English Breeds such as Angus, Hereford and Shorthorn. There are numerous combinations of crossbreds of all of the above breeds that can make it very difficult to assign an exacting variation in days for this factor. If the Continental Breeds or Continental crossbreds (Cont.X) are the predominant breed type parentage then an average of 10 additional days on feed are used for this factor when compared to the English Breeds or English crossbreds (Eng.X). Animals taken to a feedlot in there first year will need an average of 10 additional days on feed to reach maximum carcass value when compared to those animals held over into their second year.

It is also important to consider additional variation factors such as the rations to be fed to the animals and the general climate conditions for the region in which the feedlot is located. The majority of the cattle are fed in feedlots during the spring run and fall run which may have different rations. The spring rations can add five days to the total days on feed. Regional climate differences can also effect the number of days on feed needed to reach maximum carcass value. For example, the severity of winter in the northern U.S. states can add 7 to 14 days to the days on feed (due to a reduced daily rate of weight gain per animal) when compared to the central U.S. states. In a similar fashion the heat in the summer months in the southern U.S. states can add 7 to 14 days to the days on feed (due to a reduced daily rate of weight gain per animal) when compared to the central U.S. States.

Using the MRI I. Fat% Days as a basis, it is then possible to add or subtract all of the above mentioned factors with numerous variations being expressed in days to arrive at a total days on feed needed for the individual animal to reach a potential maximum carcass value. Using the feedlot entry date and adding the total days on feed, the animal is then given a Predicted Day to Maximum Value (PDMV). The PDMV formula for the required days on feed to reach maximum carcass value is as follows: Feedlot Entry Date+ [MRI I. Fat% Days+(3DS variation)+(sex variation)+(entry weight variation)+(breed type variation)+(age variation)+ (ration variation)+(climate variation)]=PDMV date. The PDMV formula factors that are expressed in days (+ or −) are listed in the following table:

PDMV Formula Factors
Variations Expressed in Days (+ or −)

| 3DS Surface Modeling | | SEX | | ENTRY WT. | | BREED TYPE | | AGE | | RATION | | CLIMATE | |
|---|---|---|---|---|---|---|---|---|---|---|---|---|---|
| Tall-lean | +8 | M | 0 | >800# | −33 | Cont. X | +10 | $1^{st}$ yr. | +10 | Spring | +5 | (far)N. U.S. | +14 |
| Tall-ave. | +6 | | | 775# | −25 | (Sern./Char./Gelb. | | | | | | | |
| Tall-wide | +4 | F | −15 | 750# | −17 | or Limo., etc.) | | $2^{nd}$ yr. | 0 | Fall | 0 | N. U.S. | +7 |
| Med-lean | +2 | | | 725# | −8 | | | | | | | | |
| Med-ave. | 0 | | | 700# | 0 | Eng. X | 0 | | | | | C. U.S. | 0 |
| Med-wide | −2 | | | 675# | +8 | (Angus/Hereford | | | | | | | |
| Short-lean | −4 | | | 650# | +17 | Shorthorn,etc.) | | | | | | S. U.S. | +7 |
| Short-ave. | −6 | | | 625# | +25 | | | | | | | | |
| Short-wide | −8 | | | <600# | +33 | | | | | | | (far)S. U.S | +14 |

Those animals that are genetically unable to attain a profitable carcass value due mainly to very low percentage of I. Fat or possibly small muscle size or poor conformation or any combination of the three are recorded for the feedlot operator as genetic rejects. Some factors such as breed type or age may not be known for an animal or a group of animals in which case a zero is used in the formula to represent that factor.

An example of two animals that both enter the feedlot on the same day, for example October $10^{th}$, with different PDMV factors is shown in the following table:

Example: Animal A

| MRI 1. Fat Days | Med.-wide | M | 650# | Eng. X | $1^{st}$ yr. | Spring | N. U.S. | PDMV Date |
|---|---|---|---|---|---|---|---|---|
| +123 | −2 | +0 | +17 | +0 | +10 | +5 | +7 | = March 19 |

Example: Animal B

| MRI 1. Fat Days | Tall-wide | M | 725# | Cont. X | $1^{st}$ yr. | Spring | C. U.S. | PDMV Date |
|---|---|---|---|---|---|---|---|---|
| +131 | +4 | +0 | −8 | +10 | +10 | +5 | +0 | = March 4 |

The evaluations for PDMV are performed on a single occasion for an animal, which usually and preferably is at the time of feedlot entry. Animals with MRI/3DS evaluations that indicate that they are genetic rejects can be removed from the feedlot if so desired. The MRI/3DS and PDMV date information is recorded electronically on a unique PDMV tag, similar in design to an EID ear tag, that includes exclusive PDMV data information for that particular animal. It is also possible that the MRI/3DS and PDMV data information for each animal is recorded and cross-referenced with the I.ID of the animal along with all of the computer animal history file database information (discussed above) commonly used in a feedlot.

Once the PDMV is assigned to numerous animals, as they leave the feedlot entry process, the computer system sorts and direct the animals into pens with animals having identical PDMVs or a similar range of PDMVs. For example, an entire pen of 300 head of cattle could be sorted so that all of them are predicted to go to market on a particular date, for example March $12^{th}$. Another entire pen of 300 head could be sorted so that all of them are predicted to go to market on a later date, for example March $13^{th}$, another on March $14^{th}$, another on March $15^{th}$ and so on. It is also possible that an entire pen of 300 head could be sorted so that all of the animals in the pen are in a similar PDMV range, for example, the range may be between PDMV March $11^{th}$ and PDMV March $13^{th}$. In this case the cattle would be delivered to the processing plant on March $12^{th}$ which is the average PDMV date for the three-day range. As feedlots grow larger and those feedlots with a capacity of 10,000 head or more may have five to ten pens feeding 300 head of cattle each that have the same PDMV. The 3DS evaluations then becomes more important in that the animals within those five to ten pens can additionally be sorted by size/conformation and gain the advantage discussed earlier with the concept of grouping animals much like the $1^{st}$ graders, $2^{nd}$ graders, $3^{rd}$ grader, etc.

Some absentee owners with cattle in a feedlot may request that the operator put all of their 900 head into three pens of 300 head each so that feed costs can be tracked more accurately for their cattle. The 900 head of cattle can be evaluated with the MRI/3DS and given PDMV dates (with PDMV tags or I.ID cross-reference) on an individual basis as they are processed upon entering the feedlot. Using traditional sorting means the cattle are then put into the three feeding pens. The cattle are then sorted out of their main feeding pens individually as they reach their PDMV range allowing the feedlot operator to market them relatively close to or on the date of their PDMV.

These PDMV sorting means will greatly reduce the inconsistencies related to the over-fed/under-fed dilemma. The MRI/3DS evaluations will also reduce the losses associated with cattle that are genetically unable to attain profitable carcass value.

FIG. 1 shows the system of the present invention that provides a MRI evaluation, preferably in concert with the 3DS evaluation, on a single occasion, that being the initial feedlot entry processing, to provide a predicted day to maximum value used for sorting cattle. Referring now to FIG. 1, the animal 102 shown in FIG. 1 is a beef animal, standing in the MRI/3DS chute apparatus 104. In this example, the MRI/3DS chute apparatus 104 is placed directly behind and in-line with the traditional chute apparatus 106 that has traditionally been used to process the animals as they enter the feedlot as previously described.

The cattle arrive at the feedlot in trucks that are unloaded at the unloading chute 108 into a holding pen 110. From the holding pen 110 the cattle are then moved into a smaller pen 112. These smaller pens 112 have various designs that allow the feedlot operators to move the cattle into a narrow lane 114. The narrow lane 114 can have some additional gates but it is designed to allow the animals to line up in single file to enter the MRI/3DS chute 104. After the animal is evaluated in the MRI/3DS chute 104, the evaluation data is transferred to the feedlot computer system 116 and the PDMV is calculated. The animal is ready to move forward to the traditional chute 106. When arriving in the traditional chute 106 the animal is processed which includes recording I.ID, weighing, vaccinations, administering health products, etc. as previously described. The MRI/3DS and PDMV date are then either combined with the I.ID processed history data or the unique PDMV tag is placed in or on the animal.

After the processing is completed the feedlot computer system 116 uses the PDMV information to sort the animal into a pen of animals with identical or similar range PDMV dates. The animal exits the traditional chute 106 and is directed to the pen by commonly used computerized electronic gates and lane systems (not shown). The animal can be directed to the PDMV assigned pen manually if so desired and the computer PDMV selection/sorting system can be adjusted manually by the operator if so desired. In addition, after receiving a PDMV date, the animal may be directed to feeding pens in a traditional manner with plans to be sorted out individually at the end of the feeding period as was previously described for the absentee owner.

The MRI/3DS chute 104 can also be placed in-line so that the cattle pass through the MRI/3DS chute 104 after being processed in the traditional chute 106. Whereas the MRI/3DS chute 104 apparatus is designed for permanent installation in most feedlots, it can also be portable with a self-contained computer system to travel to smaller feedlots or remote locations. Additionally, the MRI/3DS chute 104 can be placed at virtually any location that may or may not be associated with the feedlot entry processing, however, only one MRI/3DS evaluation on a single occasion is needed to calculate the PDMV.

Figure 2:
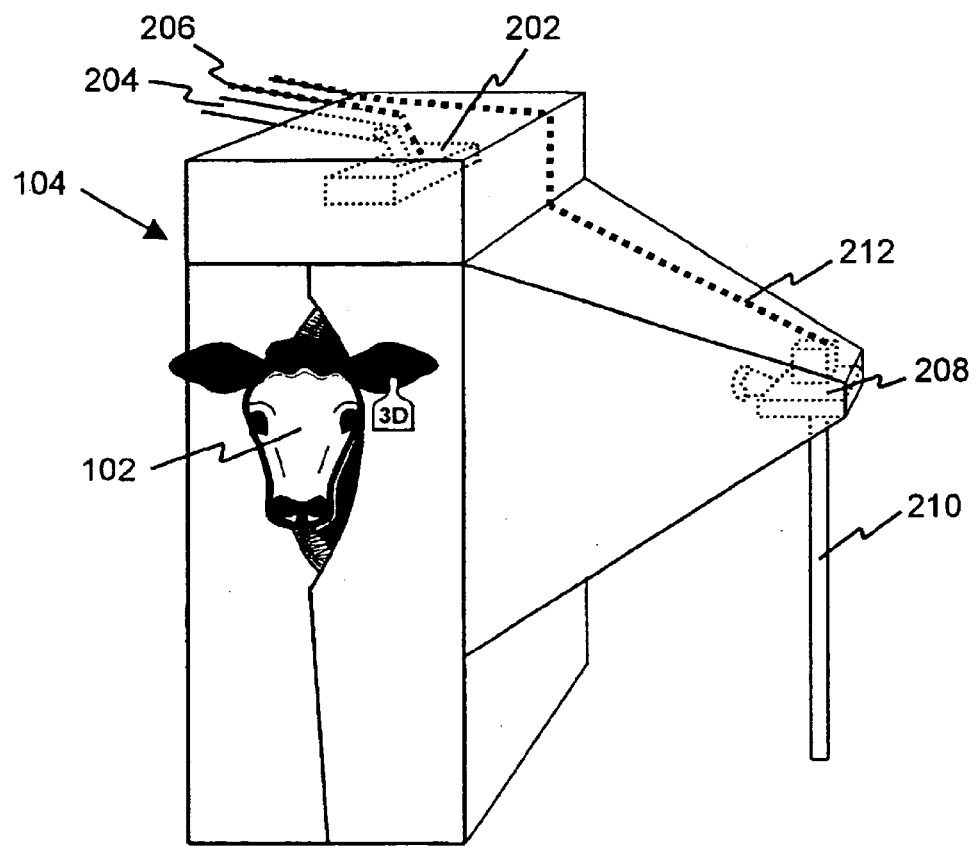
FIG. 2 shows a view of the placement of the MRI and 3DS evaluation systems within the MRI/3DS chute apparatus.

FIG. 2 shows a view of the placement of the MRI and 3DS evaluation systems within the MRI/3DS chute apparatus. Referring now to FIG. 2, the animal 102 is a beef animal, standing in the MRI/3DS chute apparatus 104. A restraining chute apparatus with a headlock to be shown later in FIG. 3 is inside the MRI/3DS chute apparatus 104. The evaluation MRI unit 202 is above and slightly to one side of the spine of the animal 102. The MRI unit 202 is guided into place for the evaluation and then returned by robotic arms 204 guided by commonly used computer robotic systems. Electric power, robotic systems guidance control cable and MRI evaluation control/data transfer cables are within a flexible cable housing 206. The evaluation 3DS unit 208 remains stationary and is placed on a standard 210, tripod or similar device. An electric power source and 3DS evaluation control/data transfer cables are within a flexible cable housing 212. The entire MRI/3DS chute 104 is enclosed except for robotic arms, entry means in the rear and exit means in the front. There are several reasons for the enclosure; 1) to prevent inadvertent stray metal objects (such as a hammer or pitchfork) from interference with the magnetic sensitivities of the MRI unit 202, 2) the entire MRI/3DS unit 104 may need to be cooled in southern hotter climates exceeding 100° Fahrenheit to prevent any very slight variances in the MRI unit 202 evaluations, 3) if the MRI unit 202 is within a mile of a radio transmitting station then the MRI/3DS chute 104 will need to be lined with copper to prevent radio transmitting from interfering with the MRI unit 202, and 4) the 3DS unit 208 performs more consistently without ambient light or stray beams of sunlight.

Figure 3A:
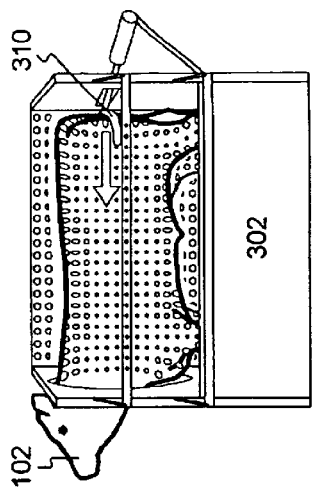
FIG. 3A–3F shows a series of consecutive scenes with the steps involved in the workings of the MRI/3DS chute apparatus as the 3DS and MRI evaluations occur.
Figure 3B:
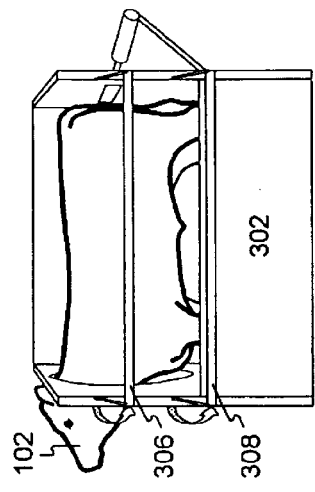
Figure 3C:
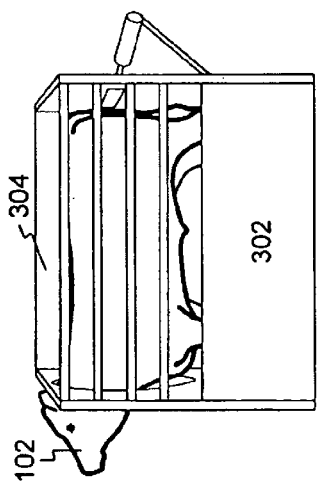
Figure 3D:
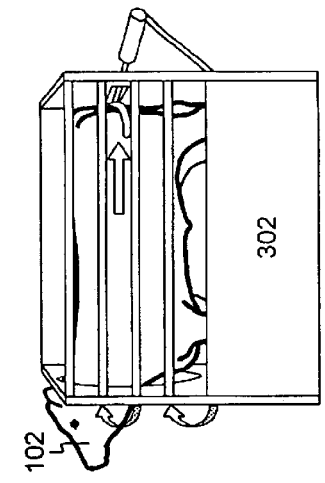
Figure 3E:
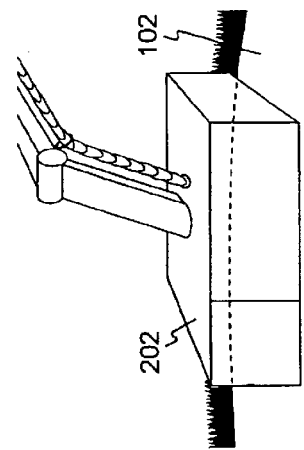
Figure 3F:
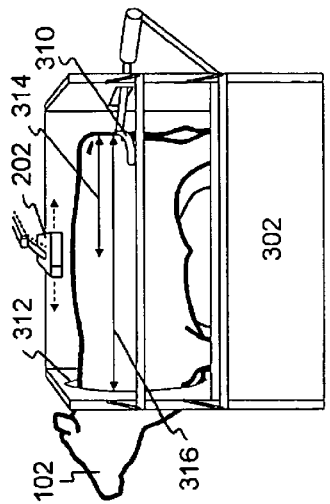

FIG. 3A through 3F show a series of consecutive scenes of the steps of the MRI/3DS unit as evaluations occur. Referring now to FIG. 3A–3F, all of the series of consecutive scenes of the beef animal 102 are shown inside the MRI/3DS chute apparatus 104. In FIG. 3A the animal 102 enters the restraining chute 302 and the far side wall 304 moves inward applying a slight pressure on the animal 102. In FIG. 3B the $2^{nd}$ bar 306 from the top moves down into alignment with the $3^{rd}$ bar and the $4^{th}$ bar 308 from the top moves down below the panel. The top bar has been removed for the purpose of easy viewing of the drawings in FIG. 3B–3D. In FIG. 3C the rear yoke 310 applies a very light pressure and the external 3DS evaluation (3DS unit 208 is out of view) is completed. The rear yoke 310 as well as any part of the restraining chute 302 can be padded to ease the handling of the animal 102. It is also possible to use a pressure sensitive airbag type system in conjunction with or instead of the rear yoke 310, the far side wall 304, or any portion of the restraining chute 302 to ease in the handling of the animal 102. The row of light spot pixels that land on the $2^{nd}$ bar 306 which covers the $3^{rd}$ bar are precalibrated in the 3DS system and are eliminated from the 3-D surface modeling of the animal. In FIG. 3D additional pressure is applied to the animal 102 from the rear yoke 310 and the distance from the rear yoke 310 to the headlock 312 is a calibrated distance 316. The MRI evaluation unit 202 is then positioned vertically by moving the unit to a known percentage distance 314 from the rear yoke 310 to the headlock 312. The known percentage 314 is usually 55% but this may vary and can be adjusted if necessary. By using a known percentage distance 314 to vertically position the MRI unit 202, all animals will be evaluated equitably between the $12^{th}$ and $13^{th}$ rib area. For example, in larger or longer animals the 55% distance would be greater and in smaller animals the 55% distance would be less, respectively. In FIG. 3E the MRI unit 202 lowers to the animal's back and the evaluation is completed in several seconds. The MRI unit 202 then returns to the original neutral position. In FIG. 3F the rear yoke 310 is released, the bars 306 and 308, and side wall 304 return to the original position. The MRI evaluation data and the 3DS evaluation data are then transferred to the feedlot computer system 116 and the PDMV is computed. The animal 102 remains in the MRI/3DS chute 104 and is then released by opening the headlock 312 allowing the animal to move forward to the processing chute 106.

Figure 4:
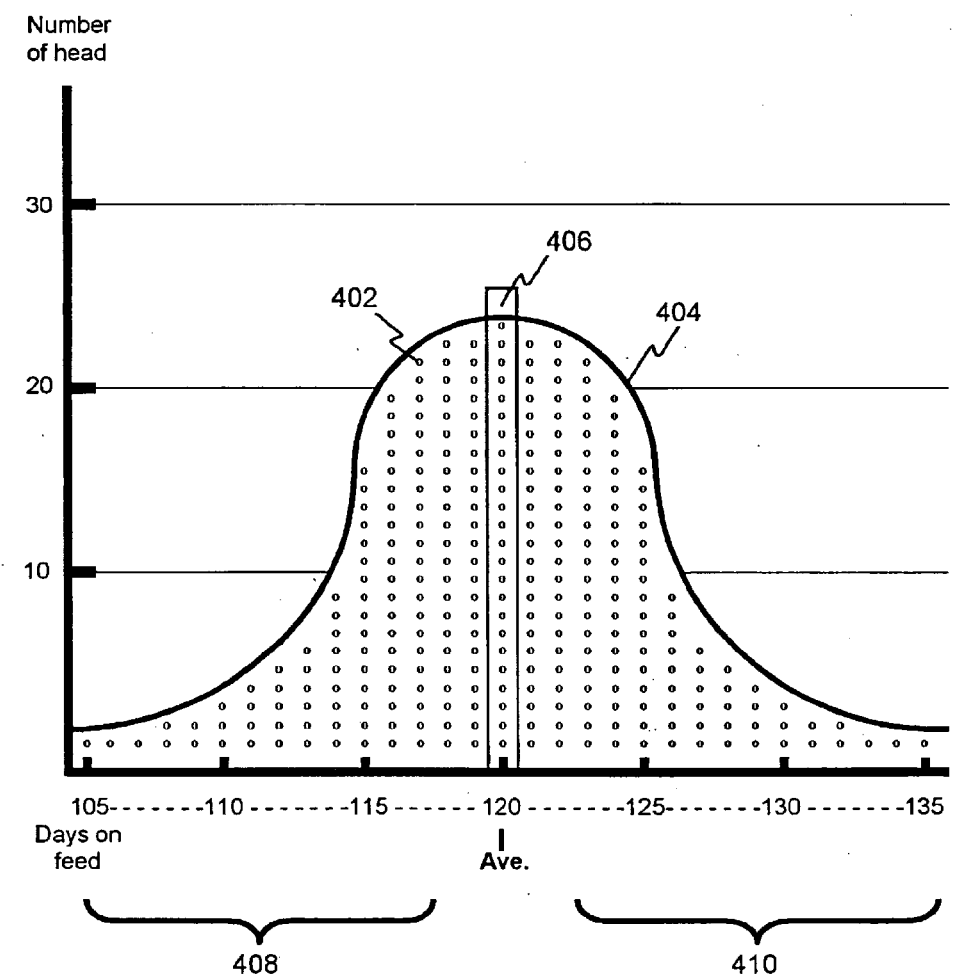
FIG. 4 shows a graph of the marketing day distribution of 300 head of cattle in a feedlot feeding pen using present day or traditional sorting means.

FIG. 4 shows a graph representing the actual marketing day distribution of 300 head of cattle in a feedlot feeding pen using present day or traditional sorting. Referring now to FIG. 4, each of the 300 smaller circles 402 would represent an animal in an average feedlot feeding pen. The vertical axis to the left represents the number of animals in one particular row. The horizontal axis on the bottom represents the number of days on feed. The days on feed are the number of days that an animal is in the feeding pen from the time the animal enters the feedlot until the animal reaches maximum carcass value. One should understand that any particular group of animals in a feedlot pen could vary dramatically. Occasionally, an animal may reach maximum carcass value in 80 to 85 days while another animal may exceed 160 to 165 days. However, this graph and the following graphs (FIG. 5A–5I) represent a conceptual explanation of an average set of cattle in feeding pen(s) of an average feedlot.

This actual marketing day distribution using traditional sorting represents a bell-shaped curve 404. The average days on feed for the entire pen is the 120 day average 406, which is the outlined column, including 24 animals. On or about the 120 day average 406, the entire pen of cattle would be loaded on trucks and transported to the processing plant. In a purest form, it would be ideal to load and transport each animal(s) on the day that they reach maximum carcass value. For example, the animal that has reached maximum carcass value of day 105 could be loaded and transported to the processing plant therein achieving a maximum carcass value on that day. On day 106, one animal could be transported and on day 107 one animal could be transported to the processing plant and on day 108 two animals could be transported and so on, as could all of the animals on each consecutive day as they reach their maximum carcass value. Then nearing the final days on feed, one animal would reach maximum carcass value and could be transported to the processing plant on day 135.

Prior art systems cannot determine precisely which animal is finished on which day, so the entire pen is market on the 120 day average 406. The results are the hidden losses included with the dilemma discussed previously, which are those animals that would be found within the group of over-fed cattle 408 and the group of under-fed cattle 410. The percentage of animals that are genetic rejects and never reach a profitable carcass value would be found randomly throughout the entire pen.

Figure 5A:
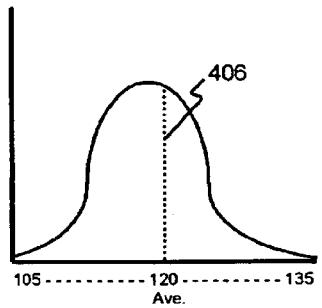
FIG. 5A–5I shows a series of graphs of the marketing day distribution of 2,700 head of cattle in nine different feeding pens with 300 head in each pen using present day or traditional sorting means.
Figure 5B:
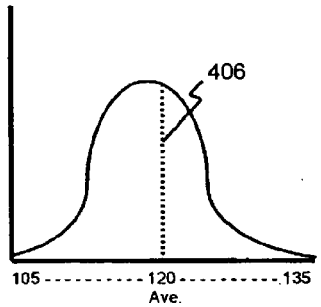
Figure 5C:
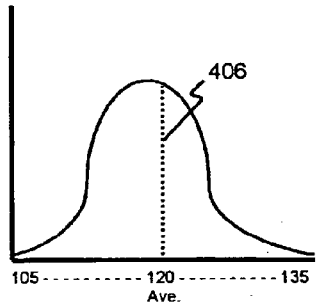
Figure 5D:
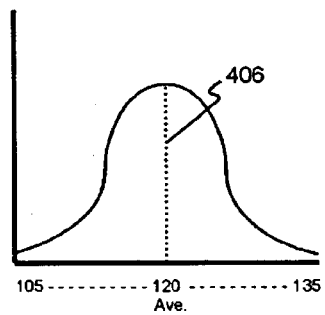
Figure 5E:
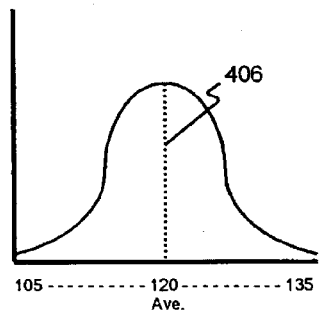
Figure 5F:
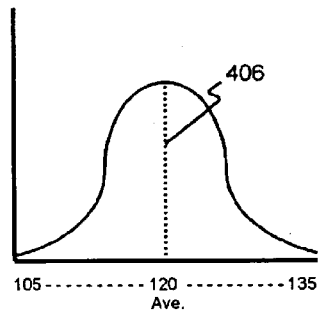
Figure 5G:
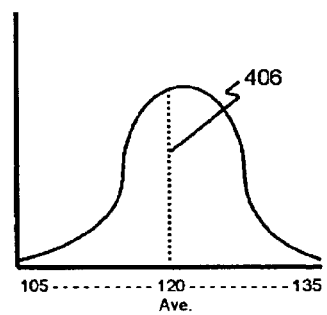
Figure 5H:
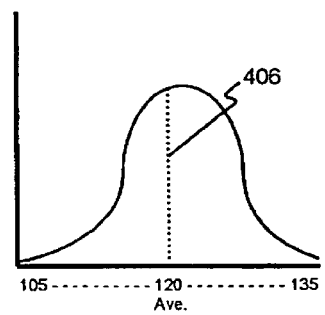
Figure 5I:
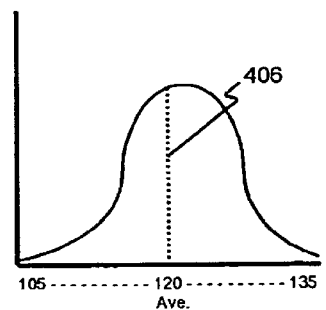

FIG. 5A through 5I shows a series of nine graphs of the marketing day distribution of 2,700 head of cattle in nine different feeding pens with 300 head in each pen using present day traditional sorting methods. Referring now to FIG. 5A–5I, each of the nine graphs do not contain sufficient detail to illustrate all of the features shown in FIG. 4 but are intended to represent graphs similar in manner to those shown in FIG. 4. In each graph the vertical axis to the left represents the number of animals in one particular row in the same manner as shown in FIG. 4. The horizontal axis on the bottom of each graph, shown in the same manner as was shown in FIG. 4, represents the number of days on feed or the number of days that an animal is in the feeding pen to reach maximum carcass value. Each graph has a bell-shaped curve that represents the market day distribution of the animals in a similar manner to the bell-shaped curve 404 shown in FIG. 4. Also each graph shows the 120 day average 406 represented in a similar manner as was shown in FIG. 4. FIG. 5A, FIG. 5B, and FIG. 5C represent three graphs of heavier animals that have been sorted into pens with 300 head in each pen. Although not scientific, those skilled in the art would recognize that these pens of cattle might be finished as a group several days before the 120 day average 406. FIG. 5D, FIG. 5E, and FIG. 5F represent three graphs of medium weight animals that have been sorted into pens with 300 head in each pen. Although not scientific, those skilled in the art would recognize that these pens of cattle might be finished as a group very close to the 120 day average 406. FIG. 5G, FIG. 5H, and FIG. 5I represent three graphs of lighter animals that have been sorted into pens with 300 head in each pen. Although not scientific, those skilled in the art would recognize that these pens of cattle might be finished several days after the 120 day average 406. The point of this series of graphs is to easily show that even with the best present day or traditional sorting methods, the bell-shaped marketing day distribution remains within each pen.

Figure 6:
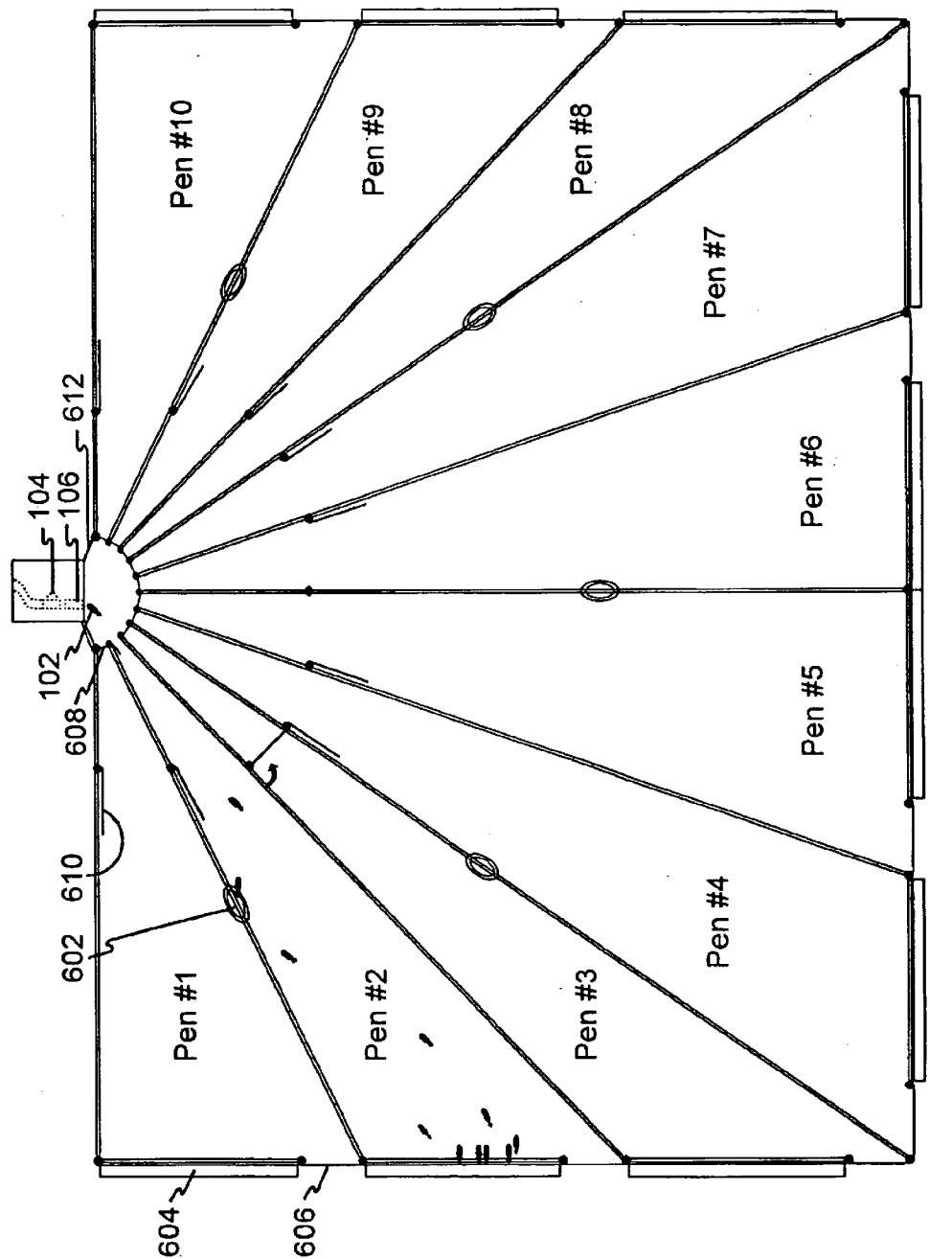
FIG. 6 shows a view of sorting pens used to sort cattle into various groups by their Predicted Days to Maximum Value (or PDMV range) as they leave the chute following their initial entry day processing.

FIG. 6 shows a view of sorting pens used to sort cattle into various groups by their PDMV or PDMV range as they leave the chute following their initial entry day processing. Referring now to FIG. 6, each of the 10 sorting pens as viewed from above have a water source 602, fence-line feedbunk 604, a sorting pen exit gate 606, a sorting pen solid entry door 608, and a restraining gate 610 similar to those shown in Pen #1. There could be more or less than 10 sorting pens depending on the total capacity of the feedlot and the desired needs of the feedlot operator. Each individual sorting pen would have a capacity that would be equal to the feedlot's largest feeding pens. For example, if a feedlot had feeding pens that hold 300 head of cattle during the feeding process, then the sorting pens would have a capacity of 300 head. Each individual sorting pen is assigned a date by the feedlot operator that corresponds to the PDMV or PDMV range of dates. For example, Pen #1 would correspond to a PDMV range of March $2^{nd}$–$4^{th}$, Pen #2 would correspond to a later PDMV range of March $5^{th}$–$7^{th}$, Pen #3 on March $8^{th}$–$10^{th}$, and so on.

During the initial entry day processing, similar to drawings shown in FIG. 1, the animal 102 passes from the MRI/3DS chute apparatus 104 to the traditional chute apparatus 106 and receives a PDMV date that is combined with an I.ID. In this example, the animal 102 has been assigned a PDMV for March $7^{th}$ which corresponds to Pen #2. When the animal 102 is ready to be released from the traditional chute apparatus 106, the computer system 116 (not shown) directs the sorting pen solid entry door 608 to open for Pen #2 while all other sorting pen entry doors remain closed. As the animal 102 leaves the traditional chute 106, all other sorting pen entry doors appear to be a solid wall. The animal can only see one opening (entry door 608 opening for Pen #2) and other animals beyond the opening. Two natural instincts, to escape danger and to return to the herd, cause the animal to enter the opening through entry door 608 into Pen #2. After passing through the entry door 608 into Pen #2, the entry door is then closed and the computer system 116 maintains a record by I.ID of the inventory of animals in each sorting pen. As additional animals are processed the sorting is repeated with each individual animal being sorted into the sorting pen that corresponds to their PDMV. If the MRI/3DS evaluation determines that an animal is a genetic reject then the animal can be removed through the side gate 612 and not sorted into the sorting pens if the feedlot operator so desires.

Some individual sorting pens may fill to the feedlot operators desired capacity in a single day. Other sorting pens may take several weeks to complete the sorting process and fill to capacity. The time needed for filling any particular sorting pen will depend on the volume of animals entering the feedlot on a daily basis and the variation of the animal's PDMV(s). In either case, the animals have access to a water source 602 and the feedlot operators can begin feeding their rations as so desired for each individual sorting pen. When the computer recorded inventory shows a particular sorting pen to be at full capacity the feedlot operator can then have the animals moved (usually manually) from the sorting pen through the exit gate 606 to the desired traditional feeding pen where they will remain until finished. For example, when the computer system 116 would show Pen #2 at the desired full capacity with 300 head, the feedlot operator would then have the cattle moved out of the sorting Pen #2 through exit gate 606 into an alley way (not shown) where they are then moved to the entry gate of their traditional feeding pen. Thereafter, Pen #2 would be assigned a new PDMV date which would correspond to the next PDMV date in the series of continued PDMV dates. During this moving process, the Pen #2 restraining gate 610 could be closed (as shown in Pen #3) allowing the sorting process to continue. Once all of the animals have been moved and the Pen #2 exit gate 606 has been closed, then the restraining gate 610 would be reopened allowing the newly sorted PDMV animals access to feed and water as the sorting process is repeated to fill the sorting Pen #2 to capacity.

All of the sorting pens are continually filled with animals by their PDMV date(s) and then the animals are moved to traditional feeding pen. Thereafter, the sorting pens are assigned a new PDMV date or range of dates and the sorting process continues until the feedlot reaches full capacity. At any time the feedlot operators can change any portion of the system to fit any particular need. For example, if a feedlot consists mostly of feeding pens with a capacity of 300 head but also has several feeding pens holding 200 head then the sorting pen inventories can be adjusted accordingly. If the feedlot has a very large capacity then cattle can be sorted initially by their PDMV and then secondly by their 3-D surface modeling. Most importantly, this sorting means allows feedlot operators to sort large volumes of cattle into individualized feeding pens of like-kind according to their predicted day to maximum carcass value.

Figure 7:
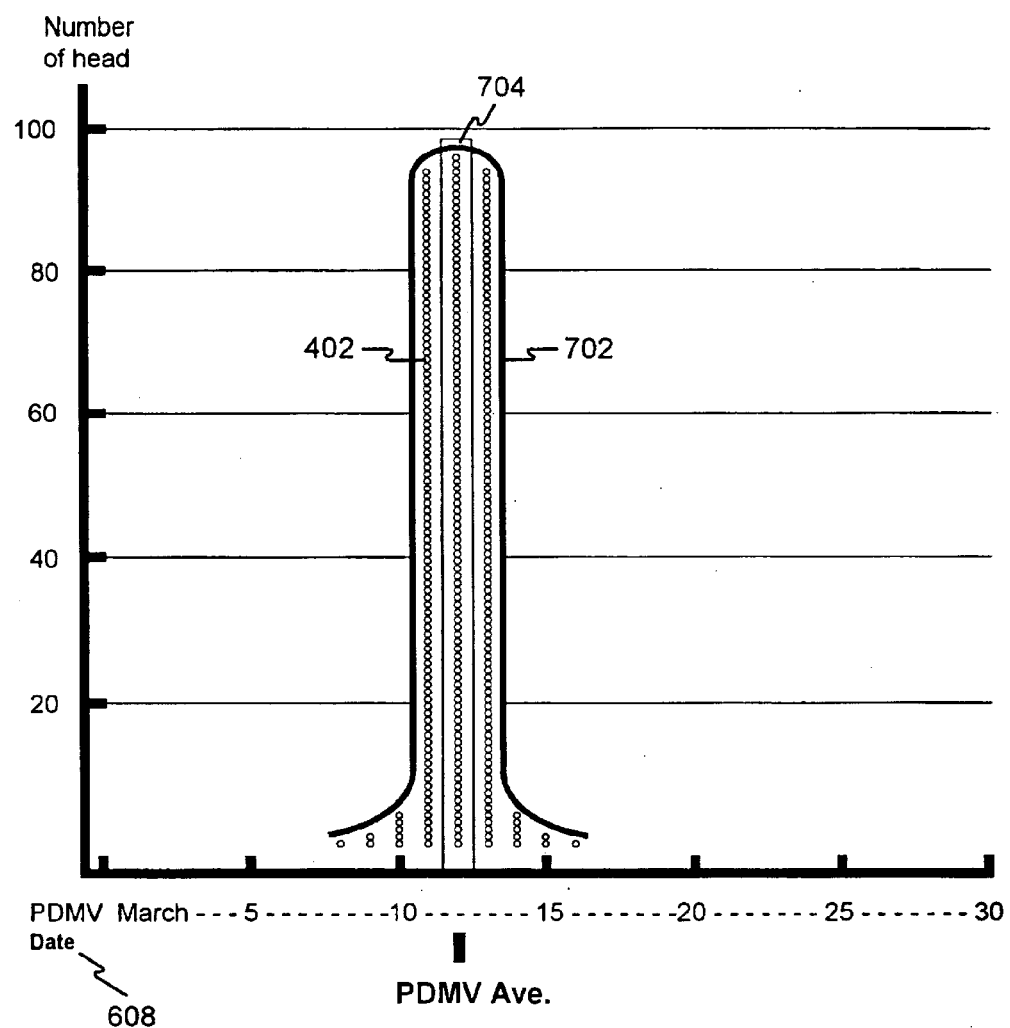
FIG. 7 shows a graph of the marketing day distribution of 300 head of cattle in a feedlot feeding pen that have received MRI/3DS evaluations in which all PDMV are within a three day range and the cattle have been sorted into this pen by their PDMV.

FIG. 7 show a graph of the marketing day distribution of 300 head of cattle is a feedlot feeding pen that have received MRI/3DS evaluations and calculate PDMV dates in which all PDMV dates are within a three day range and the cattle have been sorted into this pen by their PDMV. For FIG. 7 and all of the following figures with references to PDMV sorted cattle/pens, it is assumed that the genetic rejects determined by the MRI/3DS evaluations have been eliminated from the feeding pens, graphs, or example thereof. Referring now to FIG. 7, each of the 300 smaller circles 402 would represent an animal in a feedlot feeding pen that has been sorted using the PDMV date that was calculated from the MRI/3DS evaluation. The PDMV range is March $11^{th}$, $12^{th}$ and $13^{th}$. Again, the vertical axis to the left represents the number of animals in one particular row. The horizontal axis on the bottom represents the PDMV dates 608. In this example, all 300 animals represent a skewed bell-shaped curve 702. The average PDMV date for the entire pen is the March $12^{th}$ 704 which is the outlined column including 96 animals.

Given the sorting of cattle by their PDMV date in FIG. 7, the entire pen is loaded on trucks that transport them to the processing plant on March $12^{th}$ 704. Nearly every animal in the pen is delivered to the processing plant within a day of their predicted maximum carcass value. It is well known that when working with animals, it isn't a perfect science and a few animals will fall outside the three-day PDMV range. However, the over-fed/under-fed/genetic dilemma is dramatically reduced.

Figure 8A:
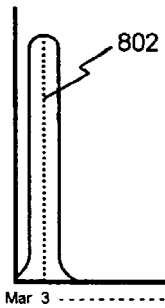
FIG. 8A–8I shows a series of graphs of the marketing day distribution of 2,700 head of cattle in nine different feeding pens with 300 head in each pen wherein all have received MRI/3DS evaluations in which all PDMV are within a three day range for each of the nine different pens and the cattle have been sorted into these pen by their PDMV.
Figure 8B:
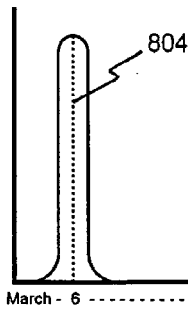
Figure 8C:
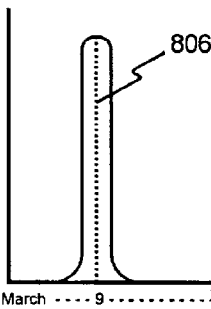
Figure 8D:
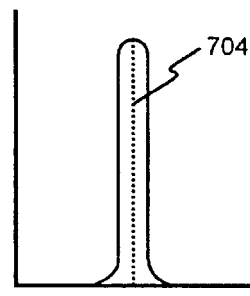
Figure 8E:
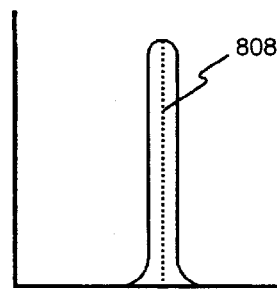
Figure 8F:
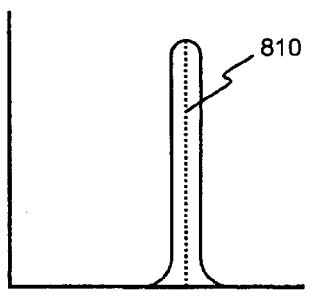
Figure 8G:
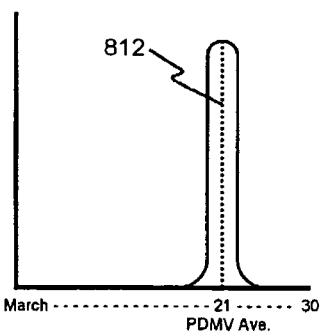
Figure 8H:
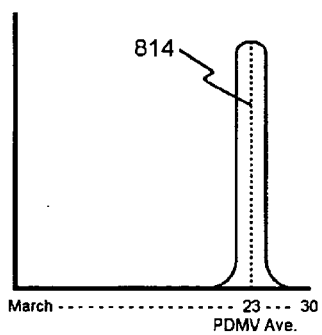
Figure 8I:
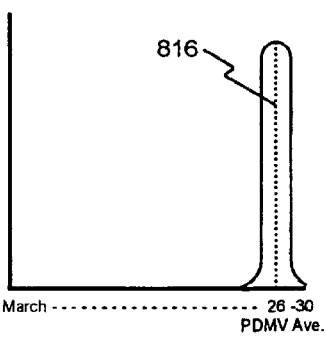

FIG. 8A through 8I shows a series of nine graphs of the marketing day distribution of 2,700 head of cattle in nine different feeding pens with 300 head in each pen. All animals have received MRI/3DS evaluations in which all PDMV dates are within a three-day range for each of the nine different pens and the cattle have been sorted into these pens by their PDMV date 608. Referring now to FIG. 8A–8I, each of the nine graphs do not contain sufficient detail to illustrate all of the features shown in FIG. 7 but are intended to represent graphs similar in manner to those shown in FIG. 7. In each graph the vertical axis to the left represents the number of animals in one particular row in a similar manner as shown in FIG. 7. The horizontal axis on the bottom of each graph, in a similar manner as was shown in FIG. 7, represents the PDMV 608 or the date that each animal is predicted to reach maximum carcass value. Each graph has a skewed bell-shaped curve that represents the PDMV date of the animals in a similar manner as the skewed bell-shaped curve 702 was shown in FIG. 7. Also each graph shows a different PDMV date that corresponds to the average PDMV date for the 300 head represented in that pen. Referring now to FIG. 8A, this graph represents a pen of 300 head sorted into a three day PDMV range with the average PDMV of March $3^{rd}$ 802. Referring now to FIG. 8B, this graph represents a pen of 300 head sorted into a three day PDMV range with the average PDMV of March $6^{th}$ 804. Referring now to FIG. 8C, this graph represents a pen of 300 head sorted into a three day PDMV range with the average PDMV of March $9^{th}$ 806 Referring now to FIG. 8D, this graph represents a pen of 300 head as shown in FIG. 7, sorted into a three day PDMV range with the average PDMV of March $12^{th}$ 704. Referring now to FIG. 8E, this graph represents a pen of 300 head sorted into a three day PDMV range with the average PDMV of March $15^{th}$ 808. Referring now to FIG. 8F, this graph represents a pen of 300 head sorted into a three day PDMV range with the average PDMV of March $18^{th}$ 810. Referring now to FIG. 8G, this graph represents a pen of 300 head sorted into a three day PDMV range with the average PDMV of March $21^{st}$ 812. Referring now to FIG. 8H, this graph represents a pen of 300 head sorted into a three day PDMV range with the average PDMV of March $23^{rd}$ 814. Referring now to FIG. 8I, this graph represents a pen of 300 head sorted into a three day PDMV range with the average PDMV of March $26^{th}$ 816. Given the sorting of 2,700 head of cattle into nine feeding pens by their PDMV dates, the 300 head are loaded into trucks on each respective PDMV date and transported to the processing plant according to their date. Again, the over-fed/under-fed/genetic dilemma is dramatically reduced.

With annual trends showing feedlots continually increasing the number of head per feedlot, the present invention has additional advantages. Larger feedlots that have a capacity over 5,000 head (some now exceeding 100,000 head capacity), will have numerous pens with the same Predicted Day to Maximum Value date. For example, a feedlot with a capacity of 12,000 head may have six to eight pens that have the same PDMV date. The 3DS portion of the MRI/3DS evaluations will allow feedlot operators to sort those cattle that have the same PDMV dates into pens by similar body size, thus gaining the $1^{st}$ grader, $2^{nd}$ grader, $3^{rd}$ grader advantage that was discussed earlier.

Figure 9:
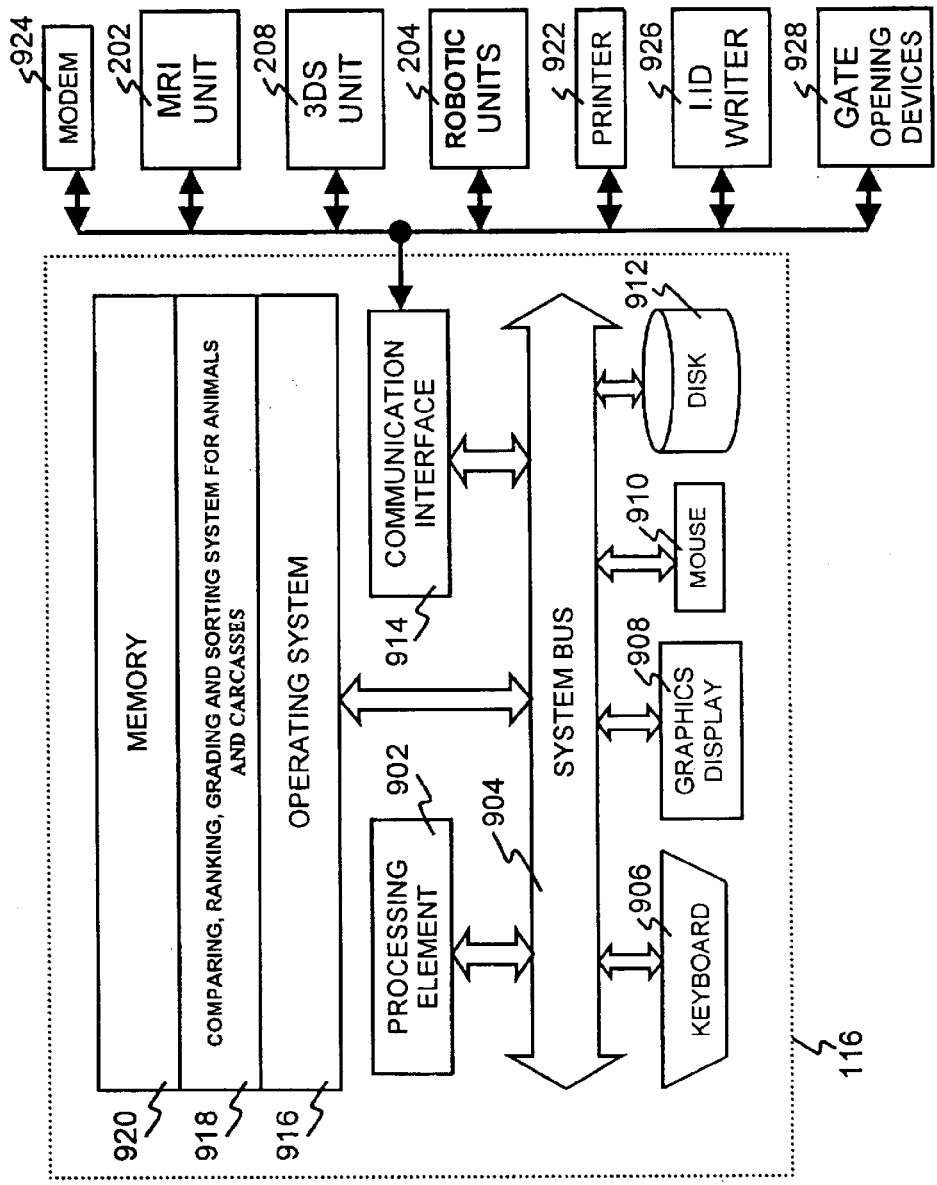
FIG. 9 shows a block diagram of the computer system of the present invention.

FIG. 9 shows a block diagram of a computer system including the MRI, 3DS and robotic units of the present invention. Referring now to FIG. 9, the computer system 116 contains a processing element 902. The processing element 902 communicates to the other elements of the computer system 116 over a system bus 904. A keyboard 906, a MRI unit 202, a 3DS unit 208, and various robotic units 204 allow input to the computer system 116. A mouse 910 provides input for locating specific points on or within the animal as displayed on graphics display 908, which also provides a display of any other information to be viewed by the user of the computer system 116. A printer 922 allows for output to paper to be viewed by a user of the computer system 116 and allows printing of identification tags. I.ID writer 924 allows other types of individual identification devices to be created, for example data could be written to a memory device and the memory device placed in a capsule for insertion under the skin of an animal. A disk 912 stores the software and data used by the system of the present invention, as well as an operating system and other user data of the computer system 116.

A memory 920 contains an operating system 916, and as application program 918, comparing, ranking, grading and sorting system for animals. Those skilled in the art will recognize that the operating system 916 could be one of many different operating systems, including many windows-type operating systems, and that many application programs could be performing in a multi-tasking operation system.

Gate Opening device 926 allows the computer system 116 to open gates of pens, for example as shown in FIG. 6 above. This is used, for example, to allow the computer system 116 to direct an animal to a specific pen after evaluating the animal as discussed above.

Figure 10:
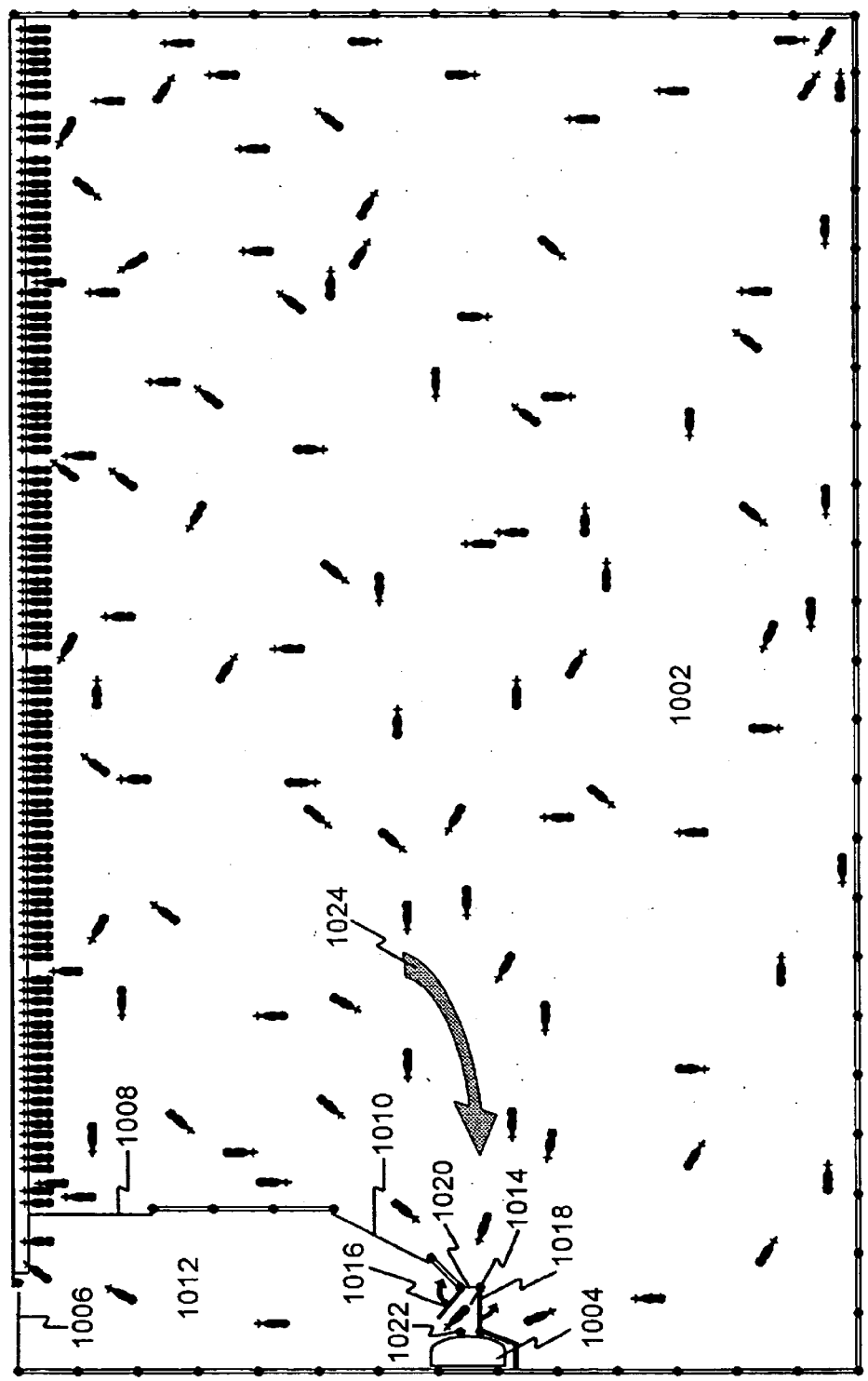
FIG. 10 shows a drawing of cattle (200 head or less) in a feeding pen as desired animal path movement is developed so that individual animals can be sorted by their PDMV on the proper day.

FIG. 10 shows a drawing of cattle in a feeding pen as desired animal path movement is developed so that individual animals can be sorted on the proper day by their PDMV after completing the feeding period. FIG. 10 describes a sorting means of individual animals by PDMV date after the animals have completed the feeding process, if for example, an absentee owner (discussed previously) or any owner for any reason has requested that their cattle are placed in pens in the traditional sorting means. Referring now to FIG. 10, the feedlot feeding pen 1002, shows a view from above, of a pen of approximately 200 animal or less that are all represented by small black symbols. Each of the animals received their PDMV dates during the feedlot entry processing. The PDMV date of each animal is electronically coded on the unique PDMV tag. Alternatively, the PDMV date can be cross-referenced with or include within the I.ID. The various animals within the feeding pen 1002 would each have PDMV dates that would range in a similar fashion to the bell-shaped curve in FIG. 4. The outline of the pen 1002 represents fencing. The portion of the pen 1002 that has numerous animals standing side by side represent the feeding bunks that are built into a containing fence. A water source is supplied in a water tank 1004. The pen gate 1006 allows the animals to enter the pen 1002 after being processes at feedlot entry time. The pen gate 1006 is also used as an exit gate for the animals after the feeding period is complete at which time they are moved down alleys (not shown) to loading chutes to be loaded onto trucks for transport to the processing plant. Gate 1008 and gate 1010 are open when the animals originally enter the pen 1002 and are closed just prior to transferring the first individual animal into the PDMV sorting pen 1012. The initial transferring of animals into the PDMV sorting pen 1012 will usually begin after the animals have been in the feeding pen approximately 90 days. By closing the gate 1008 and gate 1010 the PDMV sorting pen 1012 is created. Gate 1008 is adjustable and can move to the right to allow additional bunk feeding space if 10 or more animals are to be sorted into the PDMV sorting pen 1012. The PDMV sorting chute 1014 has a robotic sidewall gate 1016 and a robotic sidewall gate 1018. The PDMV sorting chute 1014 also has an entry robotic turnstile 1020 that allows an individual animal, in search of the water tank 1004, to enter the PDMV chute 1014 only after a previous animal has exited the PDMV chute 1014 leaving the chute empty. The PDMV chute 1014 also has an antenna apparatus 1022 in the front corner. This antenna apparatus 1022 electronically reads the unique PDMV tag or I.ID of each animal as it approaches to drink. The individual PDMV data is then transferred to the feedlot computer system 116. The gray arrow shows the desired animal path movement (DAPM) 1024.

Animals are creatures of habit and have a tremendous tendency to follow patterns using sight, hearing, smell and taste as key indicators of their habits. Any dramatic change in these indicators can be express by animal stress and can cause some animals to "shut down" for hours or days. If for example, you change water or the water tank, some animal will refuse to drink for as much as a day or two. If you drastically change feed rations or feeding bunks, some animals will "go off feed" or dramatically reduce their feed intake for a day or two resulting in weight loss. Creating DAPM with very slight changes over a period of months can prevent "shut down" within the group of cattle being fed.

When the cattle initially enter the feeding pen 1002, the internal pen gates 1008 and 1010 are in the open position. The robotic sidewall gates 1016 and 1018 are also in the open position and the turnstile 1020 swings freely so that the cattle have complete access to the water tank 1004 and the area that will become the PDMV sorting pen 1012. In this example the water source and water tank 1004 are used to entice the animals to develop the DAPM 1024 which includes a PDMV sorting chute 1014 with an adjoining PDMV sorting pen 1012. It is also possible to develop the DAPM 1024 around the feeding bunks, salt or mineral licks, individuals feeding chutes or any other means that would entice the animals to move through an area on a periodic basis that would include a PDMV sorting chute 1014 with an adjoining PDMV sorting pen 1012.

To begin the development of the DAPM 1024, the robotic sidewall gate 1016 in closed at the end of the first month. At the end of the second month, the robotic sidewall gate 1018 is closed and the robotic turnstile 1020 becomes operational by allowing an animal to enter only after the previous animal has exited. After drinking at the water tank 1004 animals are only released through robotic sidewall gate 1018 to return to the feeding pen 1002. At the end of the third month any animals in the PDMV sorting pen 1012 area are moved to the main feeding pen 1002 and the internal gates 1008 and 1010 are closed creating the empty PDMV sorting pen 1012. Shortly thereafter, the antenna apparatus 1022 data via the computer system 116 begins to record the presence of the animal, records the date/time when each animal drinks, and after allowing sufficient time to drink, directs the robotic sidewall gate 1018 to open if the animal is to remain in the feeding pen 1002. If at any time within a 24 hour period, the animal's individual PDMV date indicates that the animal is to be marketed that day, then the computer system 116 directs the robotic sidewall gate 1016 to open so that the animal enters the PDMV sorting pen 1012. The feedlot operators can then remove the cattle from the PDMV sorting pen 1012 to the alleys (not shown) and on to trucks for transport to the processing plant. All reports concerning PDMV cattle can be provided daily as well as listings for future PDMV marketing dates. The feedlot operator can review the list of animals passing through the PDMV sorting chute 1014 at any time.

The animals that are sorted into the PDMV sorting pen 1012 will act far different than those sorted into an exit way path, an exit way pen or a holding pen as described in prior art. In the PDMV sorting pen 1012, the cattle will experience virtually no stress because the sights and smells are the same around the pen and fences. The smells of the water tank and feed bunk are the same. The water will taste the same and the ration will be exactly the same within the PDMV sorting pen 1012.

Figure 11:
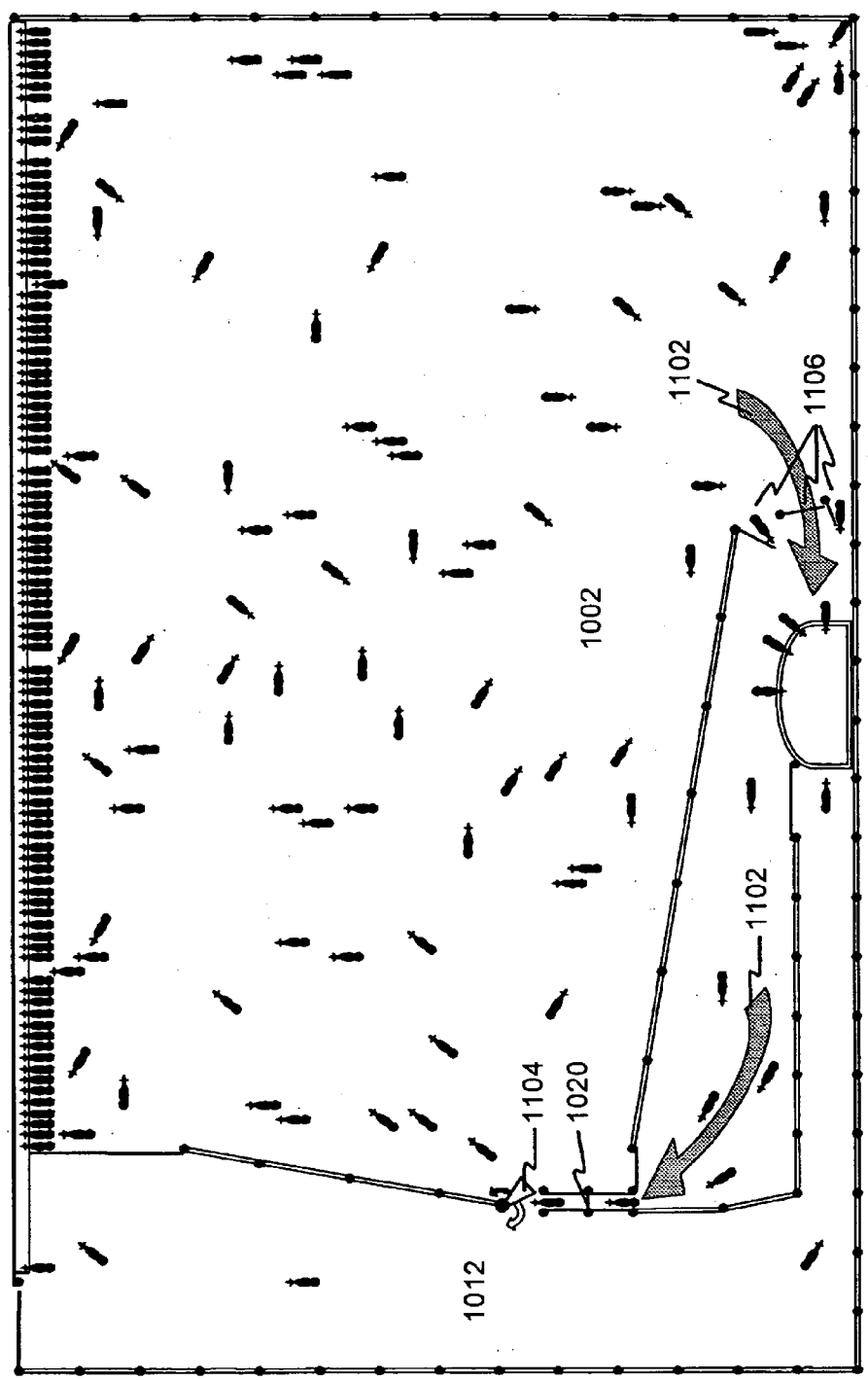
FIG. 11 shows a drawing of cattle (200 head or more) in a feeding pen as they are sorted by their PDMV on the proper day.

FIG. 11 shows a drawing of more than 200 cattle in a feeding pen as they are sorted by their PDMV dates on the proper day. Referring now to FIG. 11, all of the concepts that are explained in FIG. 10 remain the same in FIG. 11. The only difference is that in feedlot feeding pens that are larger and hold more than 200 head, the animals need to have access to water in greater numbers. There are at least one but preferably more turnstiles 1106 allowing more animals to enter the water tank area for drinking. The sorting mechanism 1104 is still directed from the feedlot computer 116 and uses robotics to shift either left or right allowing animals to return to the feeding pen 1002 or sorted to the PDMV sorting pen 1012. The desired animal path movements shown with gray arrows 1102 is still created on a gradual basis over several months by closing internal gates between the feeding pen 1002 and the PDMV sorting pen 1012. Again, in this example, the water source and water tank 1004 are used to entice the animals to develop the DAPM 1024 which includes a PDMV sorting chute 1014 with an adjoining PDMV sorting pen 1012. It is also possible to develop the DAPM 1024 around the feeding bunks, salt or mineral licks, individuals feeding chutes or any other means that would entice the animals to move through an area on a periodic basis that would include a PDMV sorting chute 1014 with an adjoining PDMV sorting pen 1012.

Referring now to the carcass segment of the beef industry, a carcass is evaluated with magnetic resonance imaging (MRI) as previously discussed. Again, the evaluation usually includes but is not limited to, measuring the surface area of a cross-section of thin voxels of the ribeye muscle, percent of I. Fat within each thin voxel of the ribeye cross-section, distribution of I. Fat within the ribeye cross-section and if applicable the thickness of the backfat along with the thickness of hide in that area. The MRI evaluations detect even microscopic flecks of I. Fat that could be missed by the human visual USDA grading or a high-resolution 2-D color video camera. It is also possible to use the individual carcass's MRI image, which is unique to each carcass, for I.ID purposes. The entire MRI image or any portion of the referenced pixels or voxels can be solely used for carcass I.ID. Additionally, the MRI images can be used for identification purposes within the packing plant as well as tracking from the previous I.ID within the feedlot or cow-calf operations.

The MRI evaluations relating to ribeye muscle size (yield) and I. Fat percentage along with I. Fat distribution within the ribeye (grade) have a very positive correlation to the grade and yield evaluations (USDA Prime, USDA Choice, USDA Select, etc.) provided by the USDA graders in the processing (packing) plant. Although the MRI evaluations have the advantage in that the carcass does not need to be severed, it is possible that the MRI evaluations could assist USDA graders.

The MRI evaluations can again, preferably be used in concert with the 3DS evaluations, however, it is possible for the MRI evaluations will provided adequate information for grading the carcasses. The 3DS evaluations add several advantages, such as overall carcass volume (related to weight) that compares each individual carcass to a standard or to various other carcasses of like kind. The 3DS evaluations measure the volume of segmented cuts such as the round in beef, ham in pork, loin, shoulder cuts, etc. 3DS evaluations also provide various linear carcass length measurements used to guide the robotic arms of the MRI apparatus and assist in determining the major or smaller cuts of the fabrication processing of the carcass.

MRI/3DS evaluations are achieved with an individual computer system or jointly with an existing processing plant computer system. The evaluations can be completed on several different occasions throughout the processing routine. For example, the MRI/3DS evaluations could occur just prior to processing when the live animal is waiting to be processed, just after hanging the carcass, before or after the aging process, or before or after the fabrication process. The carcass is usually hanging during an evaluation but could be evaluated from any of a number of positions.

In the carcass segment of the beef industry the MRI evaluations along with the 3DS evaluations (if and when applicable) do not require any formulas as the evaluations are measuring the values that have been previously predicted with the PDMV formulas. Once the MRI/3DS carcass evaluations are completed the computer system can compare, rank and rate the carcass to any standard such as a previously determine maximum value that could include USDA grading or any like system. Carcasses as well as segments of carcasses are then sorted by computer system for certain orders, packaging, predetermined fabrication processing, or any applicable means and then directed accordingly within the plant by the computer system.

Figure 12D:
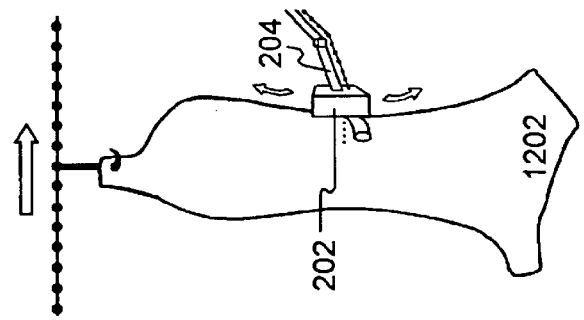
FIG. 12A–12D shows a series of consecutive scenes that show the steps involved in the working 3DS and MRI apparatus in a processing (packing) plant as carcass evaluations occur.
Figure 12C:
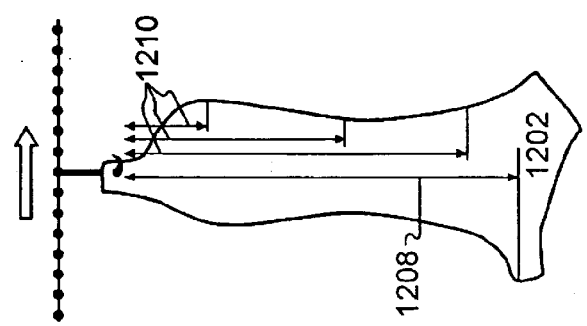
Figure 12B:
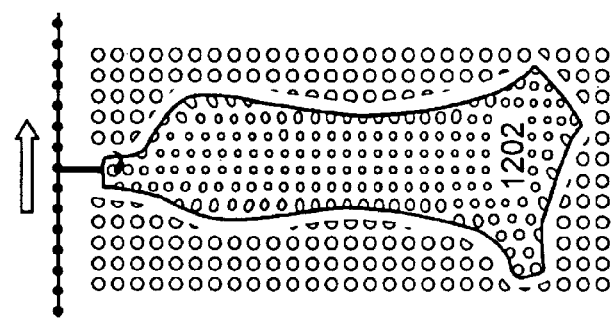
Figure 12A:
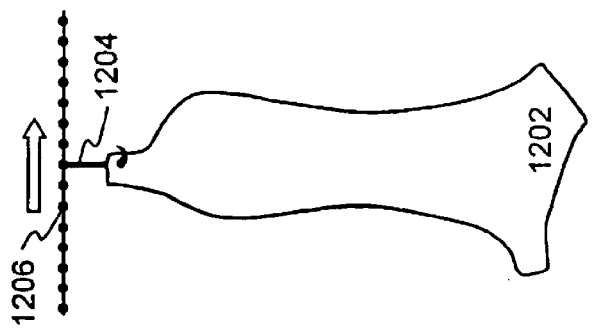

FIG. 12A though 12D shows a series of consecutive scenes that show the steps involved in the workings of 3DS and MRI apparatus in a processing plant as evaluations occur. Referring now to FIG. 12A–12D, the carcass 1202 in this example is a beef carcass hanging from a hock 1204 that is attached to a chain 1206 that is moving through a processing plant. In FIG. 12A the carcass 1202 passes into the 3DS evaluation scene area and triggers the 3DS evaluation unit. In FIG. 12B the external 3DS evaluation is completed (the 3DS unit 208 is out of view because it would block the view of this drawing) and data is transfer to the plant computer system (not shown) and the 3-D surface modeling is completed. In FIG. 12C the length of the carcass 1208 is calculated from the 3DS evaluation. Various predetermined MRI apparatus positions 1210 are also calculated from the 3DS evaluation. Various plant predetermined fabrication cuts can also be calculated at this time. In FIG. 12D the robotic arm 204 positions the MRI unit 202 against the carcass 1202 and the internal MRI evaluation is completed for at least one location and evaluation data is transferred to the computer system. After the MRI evaluation(s) is completed the robotic arms 204 return the MRI unit 202 to the original neutral position.

Referring now to the use of the MRI image for an animal's individualized identification (I.ID) and other purposes. The MRI image used for I.ID is usually taken but not limited to the area between the $12^{th}$ and $13^{th}$ rib of the animal which includes the longissimus dorsi muscle, commonly referred to as the ribeye. The MRI image used for I.ID is accomplished simultaneously with the MRI evaluation data that is compiled for determining predicted maximum values and carcass values in the meat industry. It is also possible to use the MRI image independently with any animal for the sole purpose of I.ID. In either case, the MRI image data includes but is not limited to, measuring the surface area of a cross-section of thin voxels of the ribeye muscle, percent of I. Fat within each thin voxel of the ribeye cross-section, distribution of I. Fat within the ribeye cross-section and if applicable the thickness of the backfat along with the thickness of hide in that area.

Figure 13:
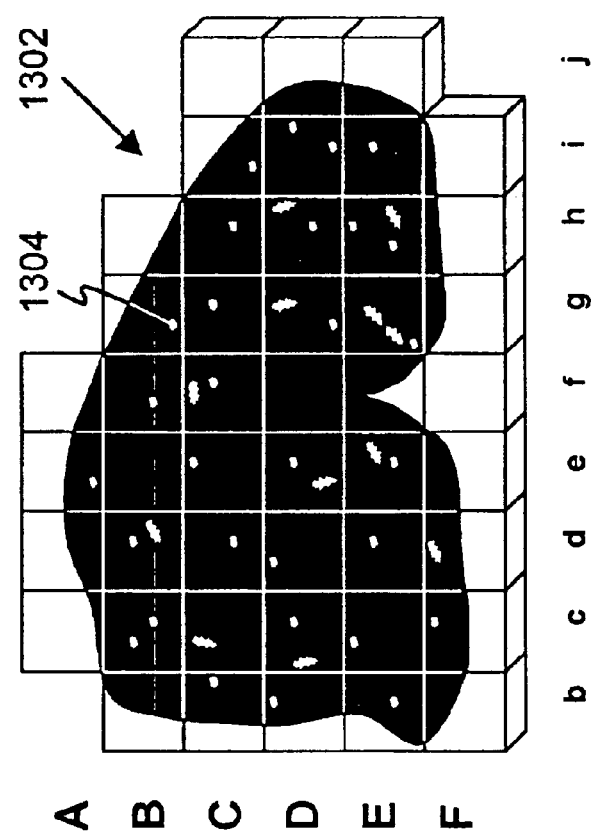
FIG. 13 shows a drawing of an MRI image of the cross-section of thin voxels of an animal muscle.

FIG. 13 shows a drawing of an MRI image of the cross-section of thin voxels (also referred to as pixels) of an animal muscle. Referring now to FIG. 13, the muscle 1302, shown in black in this example, is the longissimus dorsi muscle, commonly referred to as the ribeye muscle in the beef animal. It should be noted that the backbone which is located vertically to the left of the drawing outside the view, the rib bone which is located horizontally below the drawing outside the view, and the hide along with a portion of the backfat which is located above the drawing are outside the view, and are not shown in this drawing to simplify the conceptual explanation of deriving the I.ID from the MRI evaluation image. Those skilled in the art will recognize that of the total MRI image, only those voxels that include the ribeye muscle 1302 are referenced herein. The capital letters that are listed vertically along the left side of the drawing as well as the lower case letters listed horizontally along the bottom of the drawing are use to identify various voxel co-ordinate locations. The numerous flecks of intramuscular fat or I. Fat 1304 as shown by example in voxel B-g are represented by the various white irregular shaped spots throughout the black background of the ribeye muscle 1302. Each voxel is outline with white or black lines and a cubed effect is used along the bottom and right side of the drawing to represent the entire drawing as a thin cross-section of voxels of the ribeye muscle 1302.

Figure 14:
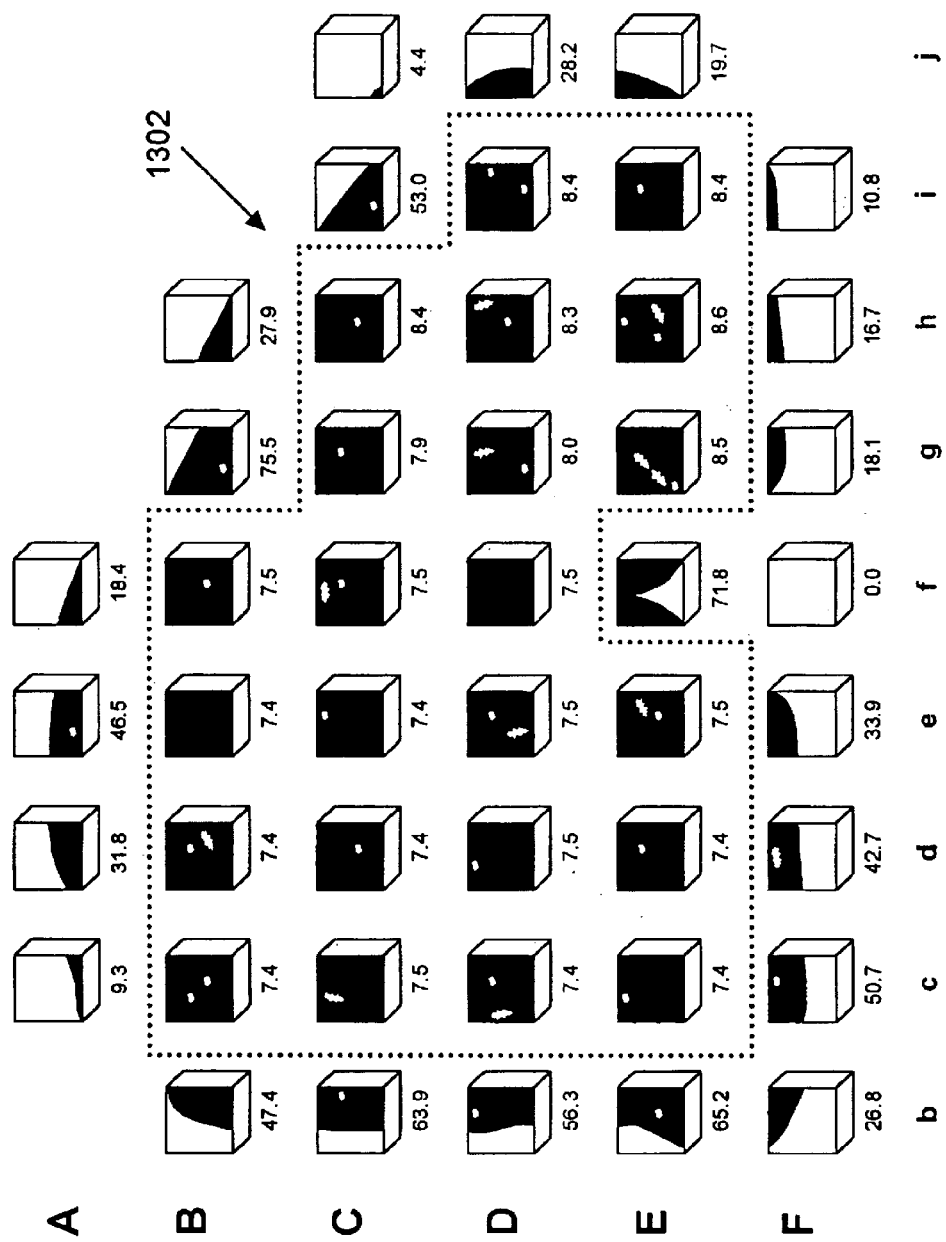
FIG. 14 shows numerous individual voxels of an MRI image of a cross-section of thin voxels of the animal muscle of FIG. 13.

FIG. 14 shows numerous individual voxels of an MRI image of a cross-section of the ribeye muscle. Referring now to FIG. 14, the referenced ribeye muscle 1302 as shown in FIG. 13 has been blown into numerous individual voxels to explain the use of the MRI evaluation for I.ID and other purposes. The vertical capital letters along the left side of the drawing and the horizontal lower case letters along the bottom of the drawing correspond to those used in FIG. 13 to identify various voxel co-ordinate locations. A cubed effect is used along the bottom and right side of each individual voxel of the drawing to represent that the entire drawing is a thin cross-section of voxels of the ribeye muscle 1302. The figure does not have sufficient detail to show the cubed effect of each individual voxel as either muscle tissue, shown as black, or as flecks of I. Fat, shown as irregular white spots. Even though it appears that there is no I. Fat in voxel B-e, for example, those skilled in the art would recognize that the flecks of I. Fat within voxel B-e could be near the far side of the voxel or entwined throughout the voxel. The MRI evaluation for the percentage of I. Fat within any voxel includes the percentage of I. Fat throughout the entire voxel and not just the I. Fat at the surface of the voxel.

Those voxels that are totally within the muscle, for example inside the dotted line, contain both muscle and I. Fat. In this example, horizontal rows of voxels B-c through B-f, C-c through C-h, D-c through D-i, E-c through E-e and E-g through E-i contain both muscle and I. Fat. The MRI evaluation determines the percentage of I. Fat within each voxel that is within the muscle area. The percentage of I. Fat is then recorded by corresponding coordinate locations for all voxels within the muscle area. In this drawing the I. Fat percentages are listed below each voxel. The percentage of muscle is also known and can be listed if needed for any purpose.

Those voxels that surround the outer edge of the muscle, for example outside the dotted line, are used to define the surface area of a cross-section of thin voxels of any muscle including the ribeye muscle. In this example, the voxels that surround the outer edge of the muscle are shown as some muscle, partially in black, and some outlying fat, partially in white. Most of the voxels surrounding the muscle contain some muscle that includes I. Fat and some outlying fat (O.F.). In some cases the surrounding voxels contains outlying material (O.M.) such as fascia, cartilage or bone which are not shown. Within each voxel the MRI evaluation records the percent of all fat, the percent of muscle, and if applicable the percent of outlying material (non-muscle and non-fat). Using C-i as an example, approximately 50–55% of that voxel is muscle to be included in the cross-section surface area calculations. The MRI evaluation for voxel C-i is 51.4% all fat, 44.6% muscle and 4.0% O.M. (fascia not shown). Since the closest voxel within the muscle to voxel C-i is voxel C-h which is 8.4% I. Fat, the amount of fat in the muscle portion of voxel C-i also contains 8.4% I. Fat. From the MRI reading of voxel C-i that recorded all fat as 51.4%, it is then possible to subtract 8.4% I. Fat from the all fat data and add 8.4% I. Fat to the 44.6% muscle data. Thus, the result is that the percentage of muscle that includes the I. Fat within the muscle is then 53.0%. A figure of 53% is then used for calculating the cross-section surface area of the voxels of the ribeye muscle. The percent muscle including I. Fat is then calculated for each voxel surrounding the outer edge of the muscle. Referred to as the outer edge percentage (O.E.%), each voxel is recorded by their corresponding co-ordinate locations. In this drawing the muscle percent including I. Fat or O.E.% is listed below each voxel.

After calculating the O.E.% for each voxel surrounding the muscle the system can then calculate the total surface area of the muscle. Initially, all of the voxels within the muscle having a known surface area are added together for a sub-total. Thereafter, the O.E.% is taken times the known surface area of each voxel surrounding the muscle and added to the subtotal of those voxels within the muscle resulting in the total surface area of a thin cross-section of the muscle. Those skilled in the art would recognize that it is possible to use larger voxels or smaller voxels for the MRI evaluation and the above technique would still result in deriving the surface area of any muscle. It is also possible to determine the general shape of the muscle for any reason by combining the voxel surface areas within the co-ordinate locations. After performing the calculations, the individualized identification is stored within the computer system (FIG. 9) where it can be retrieved and used to select any animal each time the animal is scanned again.

Using the MRI evaluation, the system can determine the distribution of I. Fat within the muscle area. This is done by comparing the various voxels or a representative sampling of voxels within the muscle area from side to side and top to bottom. Various distributions of I. Fat can add to the uniqueness of the I.ID. Uniform distribution of I. Fat throughout the muscle is desirable for marketing the meat. The value of measuring the distribution of I. Fat allows the user to detect those less desirable young animals, feedlot animals or carcasses that have a lower percentage of I. Fat in one area when compared from side to side or top to bottom.

When using the MRI evaluation for individualized identification (I.ID) it is important to note the possibilities that any two animals would have identical MRI voxel data readings. FIG. 14 shows 47 voxels within the muscle area and each voxel can range from a percent of I. Fat as low as 1.0% to as high as 12.0+%. Along with the percentage of I. Fat, the distribution of the I. Fat adds another set of numerous multiples. The voxels surrounding the muscle can range from 1.0% to 99.0%, adding more multiples. By further considering muscle shape, the number of combinations is very large, thus no two animal would have identical MRI readings, thus the MRI evaluation provides a unique I.ID for each animal. The size of voxels used in creating the individualized identification can vary such that more than 47 voxels can be used, increasing the number of possible combinations of voxel locations and percentages of I. Fat used in the individualized identification.

Given that the percentage I. Fat and I. Fat distribution does not change throughout the normal life of an animal, it is then possible to track any animal by their unique MRI I.ID from a very young age through their entire herd life. The same I.ID tracking can be used to follow animals as they change ownership. For example, those animals that are born and raised in meat producing livestock herds can be tracked to and through the feeding process even when sold several times. Processing plants can use the MRI I.ID to identify and track live animal as they enter the plant or hanging carcasses as they move throughout the plant for processing and fabrication.

In addition to the above listed I.ID uses for MRI evaluation, it should be noted that the same evaluations are used for determining predicted maximum values and carcass values in all segments of the entire meat industry. Also, the MRI evaluations can measure the backfat thickness and hide thickness of animals or carcasses for any applicable need in the meat industry. Those MRI measurements use voxels (not shown) that are above and to the right of those voxels shown in FIG. 14.

Referring now to the cow-calf segment of the beef industry, young calves 4 to 6 months old, weanlings (after being weaned from the cow), yearling or virtually any age can be evaluated with magnetic resonance imaging (MRI) as previously discussed. Again, the evaluation usually includes but is not limited to, measuring the surface area of a cross-section of thin voxels of the ribeye muscle, percent of I. Fat within each thin voxel of the ribeye cross-section, distribution of I. Fat within the ribeye cross-section and the thickness of the back fat along with, if necessary, the thickness of hide in that area. The surface area of a cross-section of thin voxels of the ribeye of a calf may only be two to three square inches and it is possible that the human eye could not even see or detect any I. Fat. However, the MRI will provide a very accurate evaluation of the percentage of I. Fat within the ribeye area even if the I. Fat cells are microscopic.

It is important to note that any animal, including a beef animal, is born with a certain percentage of I. Fat cells along with a certain percentage of muscle cells within any particular muscle bundle. This does not change throughout the normal life of an animal. Excluding the normal growth process, as the animal gains body weight the subcutaneous fat that is commonly referred to as backfat increases in thickness and the I. Fat cells within the muscle bundles individually increase in size but new I. Fat cells are not created. This is true the longissimus dorsi or ribeye muscle between the $12^{th}$ and $13^{th}$ rid area. The only exception is when an animal approaches obesity. At that time, the brain (by way of nature's rules) says there is an excess of food here and signals to add additional I. Fat cells. This brain signaling for additional I. Fat happens the last few days of feeding in a feedlot. The exact increase in the number of or percentage increase of I. Fat cells has not been measured to date. In the past it was necessary to kill the animal to measure the I. Fat accurately. Obviously, with the animal dead, they could not measure what the I. Fat had been in previous weeks nor could they measure the I. Fat in future weeks to come.

The MRI evaluations can again, preferably be used in concert with the 3DS evaluations, however, it is possible for the MRI evaluations will provided adequate information for sorting, comparing and predicting future maximum values. MRI/3DS evaluations of young stock provide numerous advantages to cow-calf operators. Included among but not limited to the advantages are MRI/3DS evaluations to compare, rank and sort individuals within the herd, across breeds, within the U.S. beef herd population and with competing international beef herds.

For example, the cow-calf herd operator is able to use internal MRI evaluations to measure his young male calf crop (considering age adjustments) for ribeye muscle size, percentage and distribution of I. Fat, and backfat thickness. The external age adjusted 3DS evaluation for growth patterns, stature and body shape would be combined with the MRI evaluations with the data compiled in a computer system. This would allow the operator to rank and compare his male calf crop within his herd and sort the elite males to be used for future herd sires or sell them at a premium value. He will also be able use the data with genetic formulas to compare the current sires and dams in his herd. His MRI/3DS data will allow him to compare and rank his calves with the national beef herd. His young male calf crop will be rated as future predicted Prime, predicted Choice or predicted Select animals or any similar rating system. Predicted grade and yield rankings would add value to the higher predicted animal on sale day.

The cow-calf operator could also use MRI/3DS evaluation to compare, rank and sort the cows in his herd and his female calf crop. Being able to select the top MRI/3DS ranking females for herd replacement and culling the lower ranked females would add tremendous genetic improvement to his herd. Genetic improvement through sire selection adds the most rapid herd improvement because the bulls have more offspring than any female in the herd. The cow-calf operator can use MRI/3DS evaluations for comparing, ranking and selecting future herd sires. Entire MRI images or any portion of referenced pixel or voxels can be used to permanently I.ID the young cattle and track them throughout their herd life or through the feedlot process and into the packing plant.

All of the above comparing, ranking and sorting applications can be easily formulated to predicted maximum values (PMV) by simply using the MRI and 3DS evaluations as a base and adjusting the data with age adjustment factors. Additionally, as the calves grow older, many factors may be used which included but are not limited to those factors used in the feedlot segment such as sex, weight, breed type, age, ration and climate. The MRI/3DS chute apparatus and evaluation process as described in FIG. 1, FIG. 2 and FIG. 3 are similar for the cow-calf segment needs except the actual chute itself is smaller when applicable to accommodate the younger animals. Whereas the MRI/3DS chute apparatus is designed for permanent installation in the feedlot segment, it can also be portable with a self-contained computer system to travel to remote cow-calf operations and smaller feedlots.

Referring now to the dairy industry, the present invention has numerous applications that include the milk secretions cell count of bred heifers. Even though the milk secretion cells in the developing mammary system may only be seen under a microscope, an internal MRI evaluation provides a very accurate cell count within the image area.

The MRI evaluation is used to determine the milk secretion cell count for I.ID bred heifers as their mammary systems develop prior to first calving. The cell count has a positive correlation to future annual milk production yields. In a similar fashion to the variation factors used in the feedlot segment of the beef industry, the main variation factor in the milk secretion cell count is the "stage of pregnancy". The number of cells increases as the bred heifer approaches calving. For example, if a heifer 40 days from calving has the same number of milk cells as a second heifer 20 days away from calving, then the 40 day heifer would be adjusted to have a higher milk cell count. Again, in the dairy segment the predicted maximum milk yield (PMMY) formula is very simple. The basic cell counts are then adjusted taking into consideration the stage of pregnancy. Once completed bred heifers are compared, ranked, graded and sorted into groups of like kinds by their PMMY for annual milk production. For example, groupings could include but are not limited to heifers with predicted annual milk production averages as follows; A. greater than 35,000 pounds of milk, B. 35,000 to 25,000 pounds of milk, and C. less than 25,000 pounds of milk.

Again, the 3DS external evaluations add additional advantages to the sorting process. A 3DS evaluation for each heifer can be accomplished at anytime but is preferably done in concert with the MRI evaluation. The 3-D surface modeling of the animal measures linear, volumetric and angular conformation traits. Included in but not limited to these measured traits are stature, width of chest, depth of heart, width of rump, volume of body (belly), angle of rump, mammary and correct angle of feet and legs. All of these functional traits either directly or indirectly provide the animal with strength, the ability to convert large volumes of feed to milk, ease of calving annually and add longevity to maintaining high levels of milk production within the herd. It is also possible to incorporate these traits into factors in the PMMY formula. Heifers as well as young milking cows can be evaluated with the 3DS and compared and sorted with like kinds. Those skilled in the art will recognize that animals that rank in the highest group for the MRI evaluations for predicted annual milk production yield and excel in the 3DS evaluations for conformation traits will have the best chance to achieve maximum lifetime milk production.

As explained in the beef feedlot segment, the computer system can also be used to direct the sorted heifers to pens of like kinds in larger heifer operations. In addition, a system as shown and described in FIG. 10 and FIG. 11 is useful for sorting heifers after a feeding period.

The computer systems, programming, and software resulting in the MRI/3DS evaluation(s) can be used independently at any location or in conjunction with existing industry computer systems and the MRI/3DS evaluation data, predicted timeframe data, PDMV data, PMV data, PMMY data, predicted milk production, predicted maximum value data or any other data deem necessary will be compiled from any and all locations to a main frame computer. This allows for quality control, translation, interpretation and any interaction of any data between any segment of the beef industry and the dairy industry.

While the general inventive concepts and systems have been described in connection with illustrative and presently preferred embodiments thereof, it is intended that other embodiments of these general concepts and systems be included with the scope of the claims of this application and any patent issued therefrom. It is contemplated that use of the present system will enable an enhanced knowledge with respect to the correlation between internal and external measurable characteristics and traits, predictable maximum values, and timeframes needed to reach those maximum values based on past maximum performances of carcasses or animal and their offspring. While the general concepts and systems of the invention have been illustrated and described by reference to a particular kind of animal and carcasses, i.e., beef animal, it is to be understood and it is contemplated that the general concepts may be applied to other kinds of animals or animal carcasses, such as swine, buffalo, dairy cattle, horses, poultry, exotic meat producing animal, etc. for any worthwhile purpose.

What is claimed is:

1. A method for determining a number of days to maximum value to continue feeding an animal prior to processing the animal in order to obtain a predetermined maximum value for the animal, said method comprising the steps of:
   (a) acquiring an image of a predetermined internal location within the animal;
   (b) measuring a percentage of intramuscular fat within said image acquired in step (a);
   (c) determining said number of days to maximum value from said percentage of intramuscular fat measured in step (b); and
   (d) processing the animal after the animal has been fed for substantially said number of days to maximum value.

2. The method of claim 1 wherein step (a) further comprises the following step (a1) and step (c) further comprises the following steps (c1) and (c2):
   (a1) measuring a height of the animal;
   (c1) adding a predetermined number of days to said number of days to maximum value when said height of the animal is greater than a predetermined height for a same type of animal; and
   (c2) subtracting a predetermined number of days from said number of days to maximum value when said height of the animal is less than said predetermined height for a same type of animal.

3. The method of claim 1 wherein step (a) further comprises the following step (a1) and step (c) further comprises the following steps (c1) and (c2):
   (a1) measuring a width of the animal;
   (c1) adding a predetermined number of days to said number of days to maximum value when said width is less than a predetermined width for a same type of animal; and
   (c2) subtracting a predetermined number of days to said number of days to maximum value when said width is greater than said predetermined width for a same type of animal.

4. The method of claim 1 wherein step (a) further comprises the following step (a1) and step (c) further comprises the following steps (c1) and (c2):
   (a1) measuring a weight of the animal;
   (c1) adding a predetermined number of days to said number of days to maximum value for each incremental amount said weight of the animal is less than a predetermined weight; and
   (c2) subtracting a predetermined number of days from said number of days to maximum value for each incremental amount said weight of the animal exceeds said predetermined weight.

5. The method of claim 1 wherein step (a) further comprises the following step (a1) and step (c) further comprises the following step (c1):
   (a1) inputting a breed type of the animal from a user of the system; and
   (c1) adjusting said number of days to maximum value by a predetermined number of days for each breed of animal.

6. The method of claim 1 wherein step (a) further comprises the following step (a1) and step (c) further comprises the following step (c1):
   (a1) inputting a geographic location where the animal is fed from a user of the system; and
   (c1) adjusting said number of days to maximum value by a predetermined number of days for each of a plurality of predetermined geographic locations.

7. The method of claim 1 wherein step (a) further comprises the following step (a1) and step (c) further comprises the following step (c1):
   (a1) inputting an age of the animal from the user of the system; and
   (c1) adjusting said number of days to maximum value by a predetermined number of days when said age of the animal is less than a predetermined age.

8. The method of claim 1 wherein step (a) further comprises the following step (a1) and step (c) further comprises the following step (c1):
   (a1) inputting a type of feed ration being given to the animal from the user of the system; and
   (c1) adjusting said number of days to maximum value by a predetermined number of days for each predetermined type of feed ration being given to the animal.

9. The method of claim 1 wherein step (a) further comprises the following step (a1) and step (c) further comprises the following step (c1):
   (a1) determining a sex of the animal; and
   (c1) subtracting a predetermined number of days from said number of days to maximum value when said sex of the animal is female.

10. The method of claim 1 wherein step (c) further comprises the steps of:
    (c1) determining a feeding pen for the animal from said number of days to maximum value; and
    (c2) directing the animal to said feeding pen determined in step (c1).

11. The method of claim 1 wherein step (c) further comprises the steps of:
    (c1) creating an individualized identification device containing said number days; and
    (c2) inserting said individualized identification device into the animal.

12. The method of claim 1 wherein step (c) further comprises the steps of:
    (c1) creating an individualized identification device containing said number days; and
    (c2) attaching said individualized identification device to the animal.

13. The method of claim 1 wherein step (c) further comprises the steps of:
    (c1) creating an individualized identification record containing said number days; and (c2) retaining said individualized identification record for the animal.

14. The method of claim 1 wherein step (c) further comprises the following step (c1) and wherein step (d) further comprises the following step (d1):
(c1) determining a future date for processing the animal by adding said number of days to maximum value to a date when said measurements of step (b) are made; and
(d1) processing the animal on substantially said future date.

15. A system for determining a number of days to maximum value to continue feeding an animal prior to processing the animal in order to obtain a predetermined maximum value for the animal, said system comprising:
an imaging device for scanning a predetermined internal location within the animal to create a scanned image;
a computer system that reads said scanned image from said imaging device, measures a percentage of intramuscular fat contained in said scanned image, and determines said number of days to maximum value from said percentage of intramuscular fat; and
a feeding pen for holding and feeding the animal for substantially said number of days to maximum value.

16. The system of claim 15 further comprising:
a three dimensional measuring system connected to said computer system for measuring a height of the animal;
a sub-system within said computer system for adding days to said number of days to maximum value when said height of the animal is greater than a predetermined height for a same type of animal; and
a second sub-system within said computer system for subtracting days from said number of days to maximum value when said height of the animal is less than said predetermined height for a same type of animal.

17. The system of claim 15 further comprising:
a three dimensional measuring system connected to said computer system for measuring a width of the animal;
a sub-system within said computer system for adding a predetermined number of days to said number of days to maximum value when said width is less than a predetermined width for a same type of animal; and
a second sub-system within said computer system for subtracting a predetermined number of days to said number of days to maximum value when said width is greater than said predetermined width for a same type of animal.

18. The system of claim 15 further comprising:
a scale connected to said computer system for measuring a weight of the animal;
a sub-system within said computer system for adding a predetermined number of days to said number of days to maximum value for each incremental amount said weight of the animal is less than a predetermined weight; and
a second sub-system within said computer system for subtracting a predetermined number of days from said number of days to maximum value for each incremental amount said weight of the animal exceeds said predetermined weight.

19. The system of claim 15 further comprising:
a keyboard attached to said computer system for inputting a breed type of the animal from a user of the system; and
a subsystem within said computer system for adjusting said number of days to maximum value by a predetermined number of days for each breed of animal.

20. The system of claim 15 further comprising:
a keyboard attached to said computer system for inputting a geographic location where the animal is fed from a user of the system; and
a sub-system within said computer system for adjusting said number of days to maximum value for each of a plurality of predetermined geographic locations.

21. The system of claim 15 further comprising:
a keyboard attached to said computer system for inputting an age of the animal from the user of the system; and
a sub-system within said computer system for adjusting said number of days to maximum value by a predetermined number of days when said age of the animal is less than a predetermined age.

22. The system of claim 15 further comprising:
a keyboard attached to said computer system for inputting a type of feed ration being given to the animal from the user of the system; and
a sub-system within said computer system for adjusting said number of days to maximum value by a predetermined number of days for each predetermined type of feed ration being given to the animal.

23. The system of claim 15 further comprising:
a keyboard attached to said computer system for inputting a sex of the animal; and
a sub-system within said computer system for subtracting a predetermined number of days from said number of days to maximum value when said sex of the animal is female.

24. The system of claim 15 further comprising:
an identification writer device attached to said computer system for creating an individualized identification device containing said number days to maximum value, wherein said individualized identification device is attached to the animal after being created.

25. The system of claim 15 further comprising:
an identification writer device attached to said computer system for creating an individualized identification device containing said number days to maximum value, wherein said individualized identification device is inserted into the animal after being created.

26. The system of claim 15 further comprising:
a sub-system within said computer system for creating an individualized identification record containing said number days to maximum value, wherein said individualized identification retained for the animal after being created.

27. A method for determining a muscle size and quality in an animal prior to ranking the animal in order to obtain a predetermined maximum value for the animal, said method comprising the steps of:
(a) acquiring an image of a muscle at a predetermined internal location within the animal; and
(b) determining said muscle size and muscle quality value from said image acquired in step (a); and
(c) ranking the animal into a predetermined class of animals when said muscle size and said muscle quality value meet predetermined criteria.

28. A method for determining a number of days to maximum value to continue feeding each of a plurality of animals prior to processing the animals in order to obtain a predetermined maximum value for each of the animals, said method comprising the steps of:
(a) acquiring an image of a predetermined internal location within each animal;

(b) measuring a percentage of intramuscular fat within said image acquired in step (a);

(c) determining said number of days to maximum value from said percentage of intramuscular fat measured in step (b);

(d) storing, for each animal, said number of days to maximum value determined in step (c);

(e) directing all animals to a common pen; and (f) selecting an animal as the animal passes a predetermined location within said common pen, retrieving said number of days to maximum value for said selected animal, and when said selected animal has been fed for said number of days to maximum value, directing said selected animal to a sorting pen.

29. A method for determining an individualized identification for each of a plurality of animals, and using said individualized identification to select a particular animal, said method comprising the steps of:

(a) acquiring an image of a predetermined internal location within each animal;

(b) measuring a percentage of intramuscular fat within each of a plurality of voxels within said image acquired in step (a);

(c) determining said individualized identification from said percentage of intramuscular fat within each voxel measured in step (b);

(d) storing, for each animal, said individualized identification determined in step (c) to create a plurality of stored individualized identifications;

(f) selecting an animal as the animal passes a predetermined location within said common pen, by performing steps (a) through (c) as the animal passes said predetermined location, and selecting the animal when individualized identification determined in step (f) matches one of said plurality of stored individualized identifications.

* * * * *